(12) United States Patent
Osawa

(10) Patent No.: US 11,027,934 B2
(45) Date of Patent: **\*Jun. 8, 2021**

(54) MULTI-FEED DETECTION DEVICE, MULTI-FEED DETECTION METHOD, AND ELECTRONIC DEVICE

(71) Applicant: Seiko Epson Corporation, Tokyo (JP)

(72) Inventor: Eiji Osawa, Chino (JP)

(73) Assignee: Seiko Epson Corporation

( \* ) Notice: Subject to any disclaimer, the term of this patent is extended or adjusted under 35 U.S.C. 154(b) by 97 days.

This patent is subject to a terminal disclaimer.

(21) Appl. No.: 16/408,623

(22) Filed: May 10, 2019

(65) Prior Publication Data
US 2019/0344988 A1 Nov. 14, 2019

(30) Foreign Application Priority Data
May 11, 2018 (JP) .............................. JP2018-091950

(51) Int. Cl.
*B65H 7/12* (2006.01)
*G01N 29/11* (2006.01)

(52) U.S. Cl.
CPC .............. *B65H 7/125* (2013.01); *G01N 29/11* (2013.01)

(58) Field of Classification Search
CPC ........ B65H 7/125; G01N 29/11; G01N 29/27; G01N 29/0075; G01N 29/4445; G01B 17/02
See application file for complete search history.

(56) References Cited

U.S. PATENT DOCUMENTS

| | | | | |
|---|---|---|---|---|
| 4,117,732 A | * | 10/1978 | Brazhnikov | G01B 17/02 73/599 |
| 4,446,735 A | * | 5/1984 | Weilacher | G01B 17/02 73/159 |
| 5,621,173 A | * | 4/1997 | Knorr | G01B 17/02 73/159 |
| 5,922,960 A | * | 7/1999 | Toda | G01B 17/02 73/1.86 |
| 7,130,245 B2 | * | 10/2006 | Okitsu | B65H 7/125 367/125 |
| 7,748,274 B2 | | 7/2010 | Pellaton et al. | |
| 7,819,400 B2 | * | 10/2010 | Miyoshii | B65H 7/12 271/265.04 |
| 8,448,517 B2 | * | 5/2013 | Itsumi | B65H 7/02 73/597 |

(Continued)

FOREIGN PATENT DOCUMENTS

| | | |
|---|---|---|
| CN | 1625208 A | 6/2005 |
| DE | 20 2005 010 037 U1 | 9/2005 |

(Continued)

*Primary Examiner* — Helen C Kwok
(74) *Attorney, Agent, or Firm* — Harness, Dickey & Pierce, P.L.C.

(57) ABSTRACT

A multi-feed detection device includes a transmission circuit substrate on which an ultrasonic transmitter transmitting an ultrasonic wave is installed, and an ultrasonic receiver receiving the ultrasonic wave. The ultrasonic transmitter transmits the ultrasonic wave in a direction intersecting a thickness direction of the transmission circuit substrate and at least one of the ultrasonic transmitter and the ultrasonic receiver has a plurality of ultrasonic elements.

6 Claims, 18 Drawing Sheets

(56) References Cited

U.S. PATENT DOCUMENTS

| | | | |
|---|---|---|---|
| 8,931,777 B2* | 1/2015 | Okitsu | B65H 7/125 |
| | | | 271/262 |
| 9,561,522 B2* | 2/2017 | Knorr | G01B 17/02 |
| 2005/0127597 A1* | 6/2005 | Sano | B65H 7/125 |
| | | | 271/258.01 |
| 2007/0018376 A1 | 1/2007 | Sano et al. | |
| 2007/0034008 A1* | 2/2007 | Voss | G01N 29/27 |
| | | | 73/570 |
| 2008/0203654 A1* | 8/2008 | Chujo | B65H 7/12 |
| | | | 271/262 |
| 2011/0317230 A1 | 12/2011 | Tanaka | |
| 2012/0025458 A1 | 2/2012 | Simonis et al. | |
| 2012/0061901 A1* | 3/2012 | Yamamoto | G01B 17/00 |
| | | | 271/3.16 |
| 2013/0111995 A1 | 5/2013 | Koehler et al. | |
| 2013/0191042 A1 | 7/2013 | Lavrentyev et al. | |
| 2014/0091516 A1 | 4/2014 | Okitsu | |
| 2017/0108472 A1 | 4/2017 | Fischer | |
| 2017/0212083 A1 | 7/2017 | Georgeson et al. | |
| 2018/0120261 A1 | 5/2018 | Hsieh et al. | |
| 2019/0329999 A1* | 10/2019 | Osawa | G01B 17/02 |
| 2019/0344987 A1* | 11/2019 | Osawa | B65H 7/125 |
| 2019/0344988 A1 | 11/2019 | Osawa | |

FOREIGN PATENT DOCUMENTS

| | | |
|---|---|---|
| JP | H05-010932 A | 1/1993 |
| JP | H05-056851 U | 7/1993 |
| JP | 2008-074610 A | 4/2008 |
| JP | 5770848 B2 | 8/2015 |

\* cited by examiner

FIG. 12
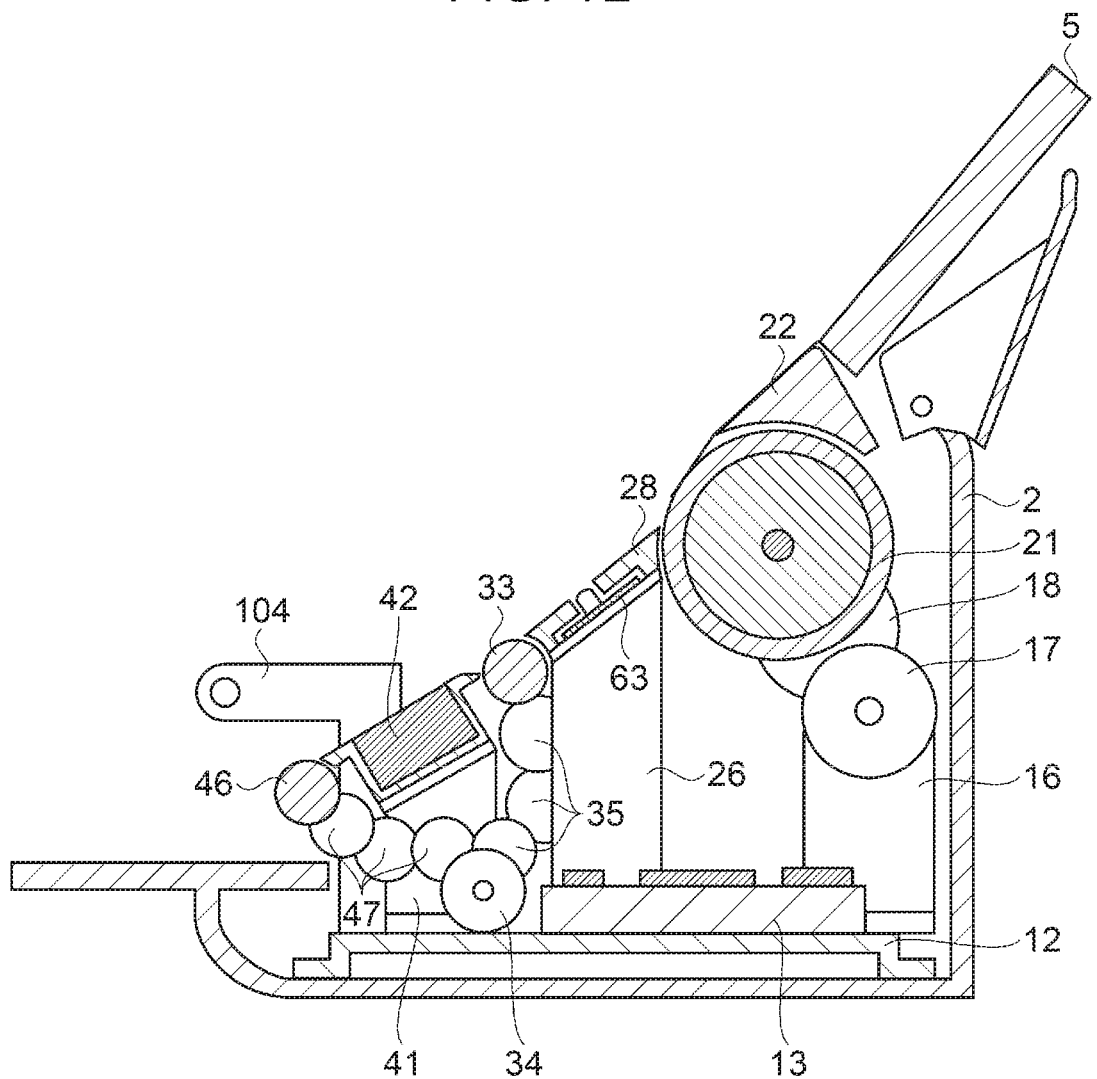
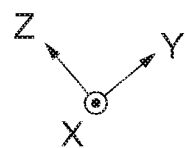

MULTI-FEED DETECTION DEVICE, MULTI-FEED DETECTION METHOD, AND ELECTRONIC DEVICE

The present application is based on and claims priority from JP Application Serial Number 2018-091950, filed May 11, 2018, the disclosure of which is hereby incorporated by reference herein in its entirety.

BACKGROUND

1. Technical Field

The present disclosure relates to a multi-feed detection device, a multi-feed detection method, and an electronic device.

2. Related Art

Devices which handle a rectangular sheet-like medium are widely used, for example, printing devices which print a character or an image on a medium such as paper and electronic devices such as a scanner which reads an image printed on a medium. Such devices stock a plurality of media and transport the media one by one. When only one sheet of paper is extracted from the plurality of media and transported, a roller or the like having a surface on which rubber is installed is used.

Here, since the frictional resistance between the plurality of media varies due to the influence of humidity or the like, the plurality of media may be transported at the same time. Transport of the overlapped plurality of media is called multi-feed. JP-UM-A-5-56851 discloses a method of detecting multi-feed. According to JP-UM-A-5-56851, an ultrasonic transmitter and an ultrasonic receiver are installed in the device. The ultrasonic transmitter transmits an ultrasonic wave, and the ultrasonic receiver receives the ultrasonic wave.

A medium passes between the ultrasonic transmitter and the ultrasonic receiver. When the medium is irradiated with the ultrasonic wave, a portion of the ultrasonic wave reflects on the medium, and a portion of the ultrasonic wave is absorbed by the medium. Further, a portion of the ultrasonic wave passes through the medium. As the number of media increases, the ultrasonic wave is absorbed by the medium and thus an intensity of the ultrasonic wave passing through the medium decreases. Accordingly, by comparing the intensity of the ultrasonic wave received by the ultrasonic receiver with a determination value, it is possible to detect that a plurality of media are being passed through when the intensity of the ultrasonic wave is smaller than the determination value.

When an advancing direction of the ultrasonic wave transmitted from the ultrasonic transmitter is set in a thickness direction of the medium, the ultrasonic wave reflected on the medium returns to the ultrasonic transmitter. When the ultrasonic wave reciprocates between the ultrasonic transmitter and the medium, the ultrasonic wave transmitted from the ultrasonic transmitter and the reciprocating ultrasonic wave interfere with each other. Therefore, the intensity of the ultrasonic wave that the ultrasonic receiver receives fluctuates.

In order to suppress the ultrasonic wave from reciprocating between the ultrasonic transmitter and the medium, the advancing direction of the ultrasonic wave transmitted from the ultrasonic transmitter is set in a direction diagonally intersecting the thickness direction of the medium. Here, a direction in which a line connecting the ultrasonic transmitter and the ultrasonic receiver extends diagonally intersects the surface of the medium. The ultrasonic transmitter and the ultrasonic receiver are fixed to a fixture, a member guiding the medium, or the like such that the advancing direction of the ultrasonic wave is diagonal to the advancing direction of the medium.

In order for the ultrasonic receiver efficiently receive the ultrasonic wave transmitted from the ultrasonic transmitter, it is necessary to dispose the ultrasonic receiver within a range of the ultrasonic wave transmitted from the ultrasonic transmitter. However, there is an error with respect to the target position in installation positions of the ultrasonic transmitter and the ultrasonic receiver in the manufacturing process. Furthermore, there is an error with respect to the target angle in the angle between the sound axis of the ultrasonic transmitter and the sound axis of the ultrasonic receiver. Since there is a need to have a process of accurately adjusting the position and the angle of the sound axis of the ultrasonic transmitter and the ultrasonic receiver, it was not easy to assemble a multi-feed detection device. Therefore, there has been a demand for a multi-feed detection device that can be easily assembled.

SUMMARY

A multi-feed detection device according to an aspect of the present application includes a substrate on which an ultrasonic transmitter transmitting an ultrasonic wave is installed, an ultrasonic receiver receiving the ultrasonic wave, and a control unit controlling the ultrasonic transmitter and the ultrasonic receiver, in which the ultrasonic transmitter transmits the ultrasonic wave in a direction intersecting a thickness direction of the substrate, and at least one of the ultrasonic transmitter and the ultrasonic receiver has a plurality of ultrasonic elements, and the control unit sets an ultrasonic element to be operated among the plurality of ultrasonic elements.

In the multi-feed detection device, the ultrasonic transmitter may include one ultrasonic element group including the ultrasonic element driven with the same drive signal, the ultrasonic receiver may include the plurality of ultrasonic elements, and the ultrasonic receiver may receive the ultrasonic wave transmitted by the ultrasonic transmitter and the ultrasonic receiver may output an electrical signal corresponding to an intensity of the ultrasonic wave from the ultrasonic element which receives the ultrasonic wave with a strongest intensity, among the plurality of ultrasonic elements.

In the multi-feed detection device, the ultrasonic transmitter may include the plurality of ultrasonic elements, and the ultrasonic receiver includes one ultrasonic element, the ultrasonic receiver may receive the ultrasonic wave transmitted by the ultrasonic transmitter, and the ultrasonic transmitter may transmit the ultrasonic wave from the ultrasonic element from which the ultrasonic receiver receives the ultrasonic wave with a strongest intensity, among the plurality of ultrasonic elements.

In the multi-feed detection device, the ultrasonic transmitter may include the plurality of ultrasonic elements, and the ultrasonic receiver may include the plurality of ultrasonic elements, the ultrasonic transmitter may transmit the ultrasonic wave from the ultrasonic element from which the ultrasonic receiver receives the ultrasonic wave with a strongest intensity, among the plurality of ultrasonic elements, and the ultrasonic receiver may output an electrical signal corresponding to the ultrasonic wave from the ultrasonic element which receives the ultrasonic wave with the strongest intensity, among the plurality of ultrasonic elements.

A multi-feed detection method according to another aspect of the present application is a multi-feed detection method of a multi-feed detection device including a substrate on which an ultrasonic transmitter transmitting an ultrasonic wave is installed, and an ultrasonic receiver having a plurality of ultrasonic elements which receive the ultrasonic wave. The method includes transmitting the ultrasonic wave by the ultrasonic transmitter, receiving the ultrasonic wave by the plurality of ultrasonic elements in the ultrasonic receiver, and specifying an optimum ultrasonic receiving element which is the ultrasonic element which receives the ultrasonic wave with a strongest intensity in the ultrasonic receiver, transmitting the ultrasonic wave from the ultrasonic transmitter to a sheet-like detection target passing between the ultrasonic transmitter and the ultrasonic receiver, receiving the ultrasonic wave passed through the detection target by the optimum ultrasonic receiving element, and detecting the number of the detection targets from an intensity of the ultrasonic wave received by the optimum ultrasonic receiving element.

A multi-feed detection method according to still another aspect of the present application is a multi-feed detection method of a multi-feed detection device including a substrate provided with an ultrasonic transmitter having a plurality of ultrasonic elements transmitting ultrasonic waves, and an ultrasonic receiver receiving the ultrasonic wave. The method includes sequentially transmitting the ultrasonic waves from the plurality of ultrasonic elements in the ultrasonic transmitter, and specifying an optimum ultrasonic transmission element which is the ultrasonic element transmitted when the ultrasonic receiver receives the ultrasonic wave with a strongest intensity in the ultrasonic transmitter, transmitting the ultrasonic wave from the optimum ultrasonic transmission element to a sheet-like detection target passing between the ultrasonic transmitter and the ultrasonic receiver, receiving the ultrasonic wave passed through the detection target by the ultrasonic receiver, and detecting the number of the detection target from an intensity of the ultrasonic wave received by the ultrasonic receiver.

A multi-feed detection method according to still another aspect of the present application is a multi-feed detection method of a multi-feed detection device including a substrate on which an ultrasonic transmitter having a plurality of ultrasonic elements transmitting ultrasonic waves is installed, and an ultrasonic receiver having the plurality of ultrasonic elements receiving the ultrasonic waves. The method includes sequentially transmitting the ultrasonic waves from the plurality of ultrasonic elements in the ultrasonic transmitter, and specifying an optimum ultrasonic transmission element which is the ultrasonic element transmitted when the ultrasonic receiver receives the ultrasonic wave with a strongest intensity in the ultrasonic transmitter, receiving the ultrasonic wave transmitted by the optimum ultrasonic transmission element by the plurality of ultrasonic elements in the ultrasonic receiver, and specifying an optimum ultrasonic receiving element which is the ultrasonic element which receives the ultrasonic wave with the strongest intensity in the ultrasonic receiver, transmitting the ultrasonic wave from the optimum ultrasonic transmission element to a detection target passing between the ultrasonic transmitter and the ultrasonic receiver, receiving the ultrasonic wave passed through the detection target by the optimum ultrasonic receiving element, and detecting the number of the detection target from an intensity of the ultrasonic wave received by the ultrasonic receiver.

An electronic device according to still another aspect of the present application includes a multi-feed detection device installed in a transport path of a detection target and detecting whether or not two or more of the detection targets are overlapped, in which the multi-feed detection device is the multi-feed detection device described above.

BRIEF DESCRIPTION OF THE DRAWINGS

FIG. 12 is a schematic diagram for explaining the assembly adjustment method.

DESCRIPTION OF EXEMPLARY EMBODIMENTS

Hereinafter, embodiments will be described with reference to the drawings. In order to make each member in each drawing to be recognizable to each figure, the scale of each member is shown differently.

First Embodiment

Figure 1:
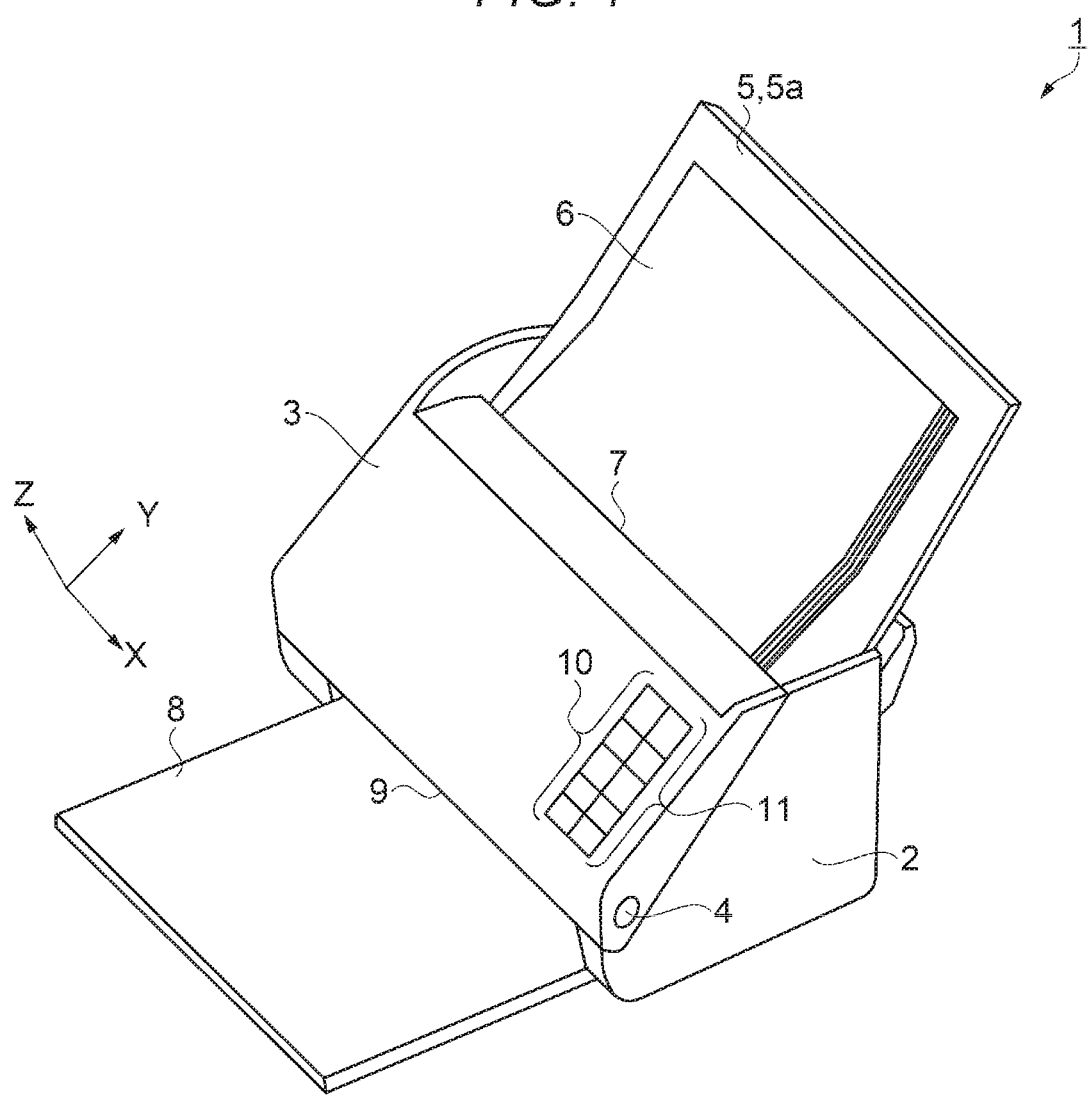
FIG. 1 is a schematic perspective diagram showing a configuration of a scanner according to a first embodiment.

In the present embodiment, a characteristic example of a scanner including a multi-feed detection device will be described with reference to the drawings. The scanner according to the first embodiment will be described with reference to FIGS. 1 to 16. The scanner is a device which reads an image drawn on a medium such as paper, and also called an image reading device. The medium is the detection target on which the multi-feed detection device performs multi-feed detection. FIG. 1 is a schematic perspective diagram showing a configuration of the scanner. As shown in FIG. 1, a scanner 1 as an electronic device includes a lower case 2 and an upper case 3. The lower case 2 and the upper case 3 are openably and closably coupled with each other by a hinge 4.

On a right upper side of the lower case 2 in FIG. 1, a cover portion 5 is pivotably attached to the lower case 2. A surface of the cover portion 5 on the upper case 3 side is a paper placing surface 5a. A plurality of sheets of paper 6 are placed as a detection target on the paper placing surface 5a. The paper 6 has a rectangular shape, and the plurality of sheets of paper 6 have the same shape. A material of the paper 6 may be made of various types of resin material other than paper or synthetic paper. An opening feeding port 7 is disposed between the paper placing surface 5a and the upper case 3. The paper 6 is transported into the scanner 1 from the feeding port 7.

An advancing direction of the paper 6 is referred to as a −Y direction. A width direction of the paper 6 is referred to as an X direction. A direction in which the paper 6 is stacked is referred to as a Z direction. The X direction, a Y direction, and the Z direction are orthogonal to each other.

A paper discharge tray 8 is installed on the −Y direction side of the lower case 2. An opening discharge port 9 is disposed in the lower case 2 between the paper discharge tray 8 and the upper case 3. The paper 6 enters into the scanner 1 from the feeding port 7 and is discharged from the discharge port 9. The paper 6 discharged from the discharge port 9 is stacked on the paper discharge tray 8. In a path through which the paper 6 moves, the cover portion 5 side is referred to as upstream, and the paper discharge tray 8 side is referred to as downstream.

An indication lamp 10 and an instruction button 11 are disposed on a +X direction side of the upper case 3. The indication lamp 10 includes a light source such as a light emitting diode (LED). The indication lamp 10 can be turned on, blinked, and turned off. The indication lamp 10 notifies an operator of predetermined information to, such as power on/off, currently selected mode, presence or absence of multi-feed detection, by turning on or off the indication lamp or by changing the color of the lamp.

The instruction button 11 includes a plurality of button-type switches for giving instructions to the scanner 1. The instruction button 11 is a switch for the operator to operate. Specifically, the instruction button 11 is configured of various switches such as a power switch, a start switch, a stop switch, a reading mode selection switch, and a switch for wireless communication.

The power switch is a switch for giving an instruction to switch supply and disconnection of power to the scanner 1. The start switch is a switch for giving an instruction to start transport of the paper 6. The stop switch is a switch for giving a stop instruction to interrupt or cancel a job started by the operation of the start switch. The reading mode selection switch is a switch for instructing a reading mode such as a color mode and image quality. The color mode includes, for example, a monochrome mode and a color mode. The switch for wireless communication is a switch for giving an instruction to switch on/off of the wireless communication.

Figure 2:
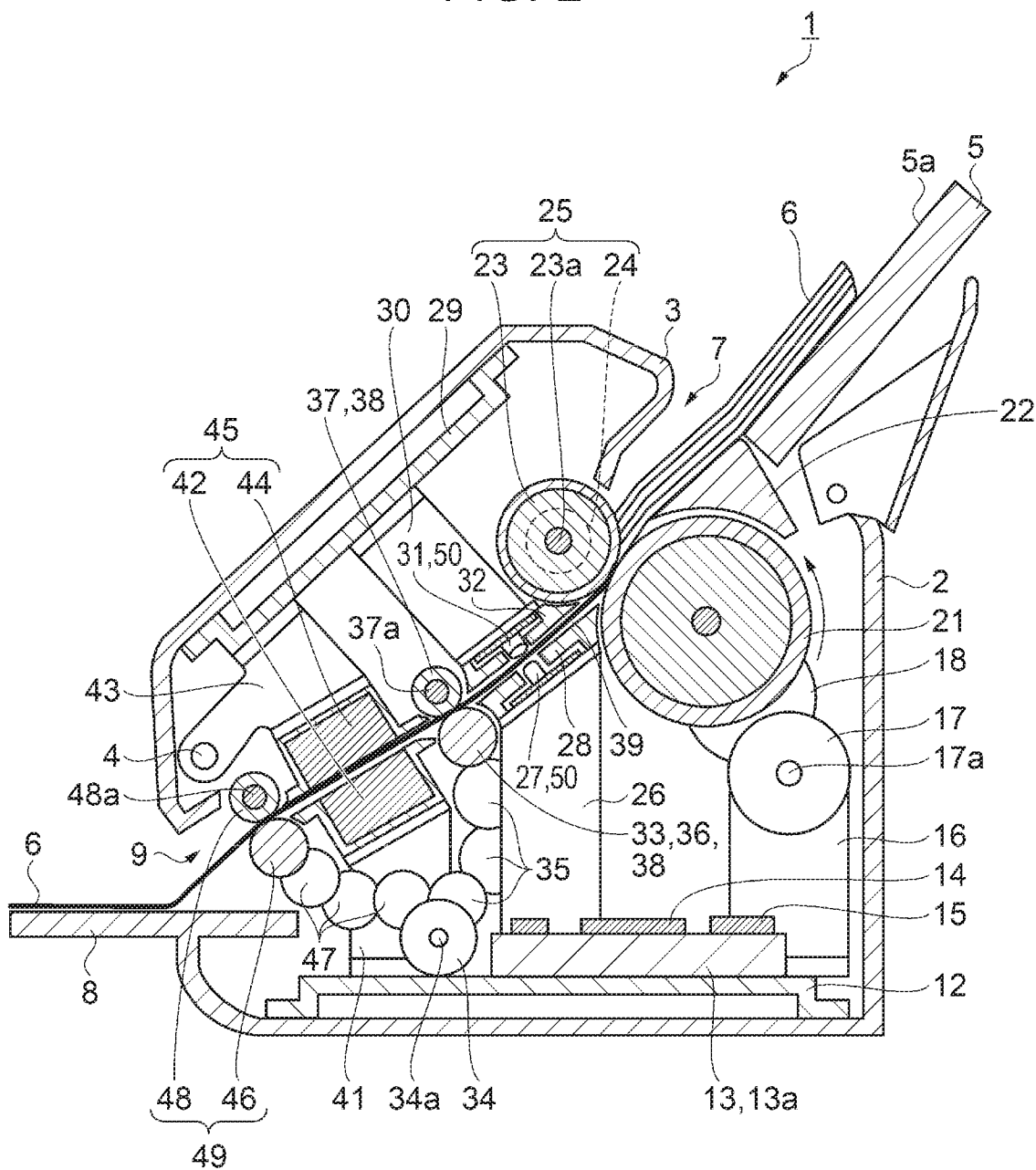
FIG. 2 is a schematic side sectional diagram showing a structure of the scanner.

FIG. 2 is a schematic side sectional diagram showing a structure of the scanner. As shown in FIG. 2, a lower substrate 12 is installed at the bottom inside the lower case 2. The lower substrate 12 is a galvanized steel sheet having rigidity. A control unit 13 is installed on the lower substrate 12. The control unit 13 is configured of an electric circuit for controlling the operation of the scanner 1. The control unit 13 includes a circuit substrate 13a, and electric circuit elements such as a central processing unit 14 (CPU) and a memory 15 are installed on the circuit substrate 13a.

A feed motor 17 supported by a first support portion 16 is installed on the lower substrate 12. A first wheel train 18 and a feed roller 21 are disposed on a +Z direction side of the feed motor 17. A tooth form is formed on a rotation shaft 17a of the feed motor 17 and gears of the first wheel train 18, respectively. A gear is installed in the feed roller 21.

When the feed motor 17 rotates the rotation shaft 17a, the torque generated by the feed motor 17 is transmitted to the feed roller 21 via the first wheel train 18. Thereby, the feed roller 21 rotates. An outer circumferential surface of the feed roller 21 is, for example, made of a high friction material such as an elastomer including rubber.

An upstream guide portion 22 is installed between the feed roller 21 and the cover portion 5. The upstream guide portion 22 is connected with the lower case 2. The paper 6 is placed on the upstream guide portion 22 and the cover portion 5. The upstream guide portion 22 and the cover portion 5 support the paper 6.

A separation roller 23 is installed on the +Z direction side of the feed roller 21. The separation roller 23 is disposed at a position facing the feed roller 21. The outer circumferential surface of the separation roller 23 is, like the feed roller 21, for example, made of a high friction material such as an elastomer including rubber.

The paper 6 placed on the upstream guide portion 22 moves in the −Y direction by the gravity acting on the paper 6. Then, an end of the paper 6 comes into contact with the separation roller 23. When the feed roller 21 is rotating in a counterclockwise direction in FIG. 2, the paper 6 being in contact with the upstream guide portion 22 enters between the feed roller 21 and the separation roller 23.

A shaft 23a of the separation roller 23 is biased by a spring (not shown). The separation roller 23 is pressed by the feed roller 21. A torque limiter 24 is installed on the shaft 23a. A separation mechanism 25 is configured of the separation roller 23 and the torque limiter 24.

When only one sheet of paper 6 is sandwiched between the feed roller 21 and the separation roller 23, the feed roller 21 and the separation roller 23 rotate together to transport the paper 6. A coil spring is installed in the torque limiter 24.

As the shaft 23a rotates, the coil spring is bent to a predetermined angle so that the torque limiter 24 stores a predetermined torque.

When two sheets of paper 6 are sandwiched between the feed roller 21 and the separation roller 23, the torque limiter 24 rotates the separation roller 23 by a predetermined angle in a direction different from the feed roller 21. Friction between the sheets of paper 6 is smaller than friction between the paper 6 and the feed roller 21, and is smaller than friction between the paper 6 and the separation roller 23. Accordingly, the overlapped paper 6 easily slides against each other. The feed roller 21 transports the paper 6 in contact with the feed roller 21 in the −Y direction, and the separation roller 23 moves the paper 6 in contact with the separation roller 23 in a +Y direction. Then, only one sheet of paper 6 is transported between the feed roller 21 and the separation roller 23. In this way, the separation mechanism 25 separates the overlapped paper 6. When three or more sheets of paper 6 are pinched between the feed roller 21 and the separation roller 23, the feed roller 21 may transport two or more sheets of paper 6.

A second support portion 26 is installed in the middle of the lower substrate 12 in FIG. 2, and an ultrasonic receiver 27 and a midstream lower guide portion 28 are installed on the second support portion 26. The ultrasonic receiver 27 is a device that receives an ultrasonic wave and converts the ultrasonic wave into an electrical signal. The midstream lower guide portion 28 guides the paper 6 passed through the feed roller 21.

An upper substrate 29 is installed on the +Z direction side inside the upper case 3. The upper substrate 29 is a galvanized steel sheet having rigidity. A third support portion 30 is installed in the middle of the upper substrate 29 in FIG. 2, and an ultrasonic transmitter 31 and a midstream upper guide portion 32 are installed on the third support portion 30. The ultrasonic transmitter 31 is a device which transmits an ultrasonic wave toward the ultrasonic receiver 27. The midstream upper guide portion 32 is disposed to face the midstream lower guide portion 28 and guides the paper 6 passed through the feed roller 21. A multi-feed detection device 50 is configured of the ultrasonic receiver 27, the ultrasonic transmitter 31, and the like. The multi-feed detection device 50 detects whether or not two or more sheets of paper 6 are overlapped. The ultrasonic receiver 27 and the ultrasonic transmitter 31 are controlled by the control unit 13.

A transport drive roller 33 is installed on the −Y direction side of the midstream lower guide portion 28. A transport motor 34 for rotating the transport drive roller 33 is installed on the left side of the control unit 13 in FIG. 2. A second wheel train 35 is disposed between the transport drive roller 33 and the transport motor 34. A tooth form is formed on a rotation shaft 34a of the transport motor 34 and the gears of the second wheel train 35, respectively. A gear is installed in the transport drive roller 33.

When the transport motor 34 rotates the rotation shaft 34a, the torque generated by the transport motor 34 is transmitted to the transport drive roller 33 via the second wheel train 35. Thereby, the transport drive roller rotates. A transport encoder 36 is installed in the transport drive roller 33, and the transport encoder 36 detects a rotation angle of the transport drive roller 33.

A transport driven roller 37 is disposed to face the transport drive roller 33 on the +Z direction side of the transport drive roller 33. A shaft 37a of the transport driven roller 37 is biased to the transport drive roller 33 side by a spring (not shown). A pair of transport rollers 38 is configured of the transport drive roller 33 and the transport driven roller 37. The paper 6 passed between the midstream lower guide portion 28 and the midstream upper guide portion 32 is sandwiched between the pair of transport rollers 38 and transported in the −Y direction.

A fourth support portion 41 is installed on the lower substrate 12 on the left side of the second support portion 26 in FIG. 2. A lower reading unit 42 is installed on the fourth support portion 41. A fifth support portion 43 is installed on the upper substrate 29 on the −Y direction side of the third support portion 30. An upper reading unit 44 is installed on the fifth support portion 43. An image reading device 45 is configured of the lower reading unit 42, the upper reading unit 44, and the like. For example, a contact image sensor module (CISM) is installed in the lower reading unit 42 and the upper reading unit 44.

The hinge 4 is installed on the fifth support portion 43. The hinge 4 is also connected to a sixth support portion (not shown) installed on the lower substrate 12. The lower substrate 12 and the upper substrate 29 pivot about the hinge 4 as an axis. The scanner 1 includes a fixed portion (not shown) which pivotably fixes the lower case 2 and the upper case 3. The fixed portion fixes the upper case 3 and the lower case 2 in a state where the upper case 3 is closed.

A discharge drive roller 46 is installed on the −Y direction side of the lower reading unit 42. A third wheel train 47 is disposed between the discharge drive roller 46 and the transport motor 34. A tooth form is formed on each gear of the third wheel train 47. A gear is installed in the discharge drive roller 46.

When the transport motor 34 rotates the rotation shaft 34a, the torque generated by the transport motor 34 is transmitted to the discharge drive roller 46 via the third wheel train 47. Thereby, the discharge drive roller 46 rotates.

A discharge driven roller 48 is disposed to face the discharge drive roller 46 on the +Z direction side of the discharge drive roller 46. A shaft 48a of the discharge driven roller 48 is biased to the discharge drive roller 46 side by a spring (not shown). A pair of discharge rollers 49 are configured of the discharge drive roller 46 and the discharge driven roller 48. The paper 6 passed through the pair of discharge rollers 49 is transported on the paper discharge tray 8 from the discharge port 9. A path through which the paper 6 is passed between the cover portion 5 and the paper discharge tray 8 is a transport path 39. The multi-feed detection device 50 is installed in the transport path 39 of the paper 6.

Figure 3:
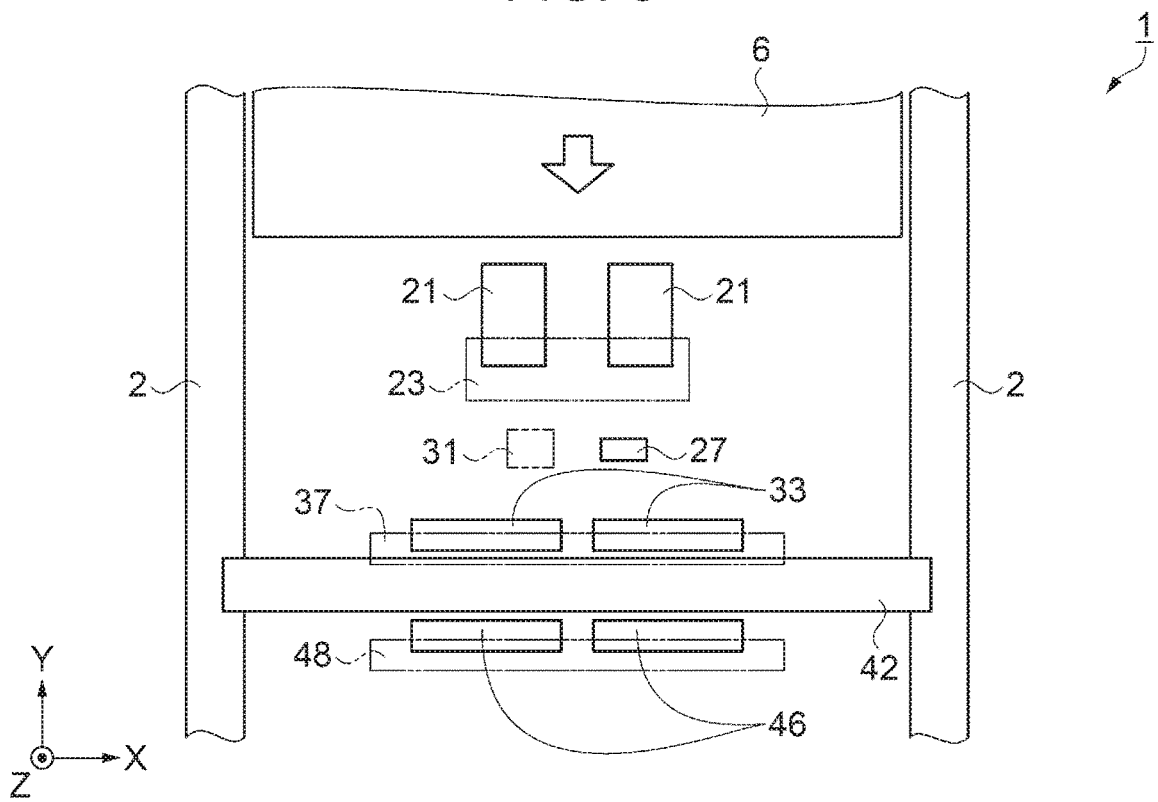
FIG. 3 is a schematic plan diagram showing the structure of the scanner.

FIG. 3 is a schematic plan diagram showing a structure of the scanner, and a diagram of the scanner 1 seen from the Z side along the transport path 39 of the paper 6. As shown in FIG. 3, two of each feed roller 21, transport drive roller 33, and discharge drive roller 46 are disposed side by side in the X direction. The separation roller 23 is disposed to face two feed rollers 21. The transport driven roller 37 is disposed to face two transport drive rollers 33. The discharge driven roller 48 is disposed to face two discharge drive rollers 46. The ultrasonic receiver 27 is disposed on the +X direction side of the scanner 1, and the ultrasonic transmitter 31 is disposed on a −X direction side of the scanner 1.

Figure 4:
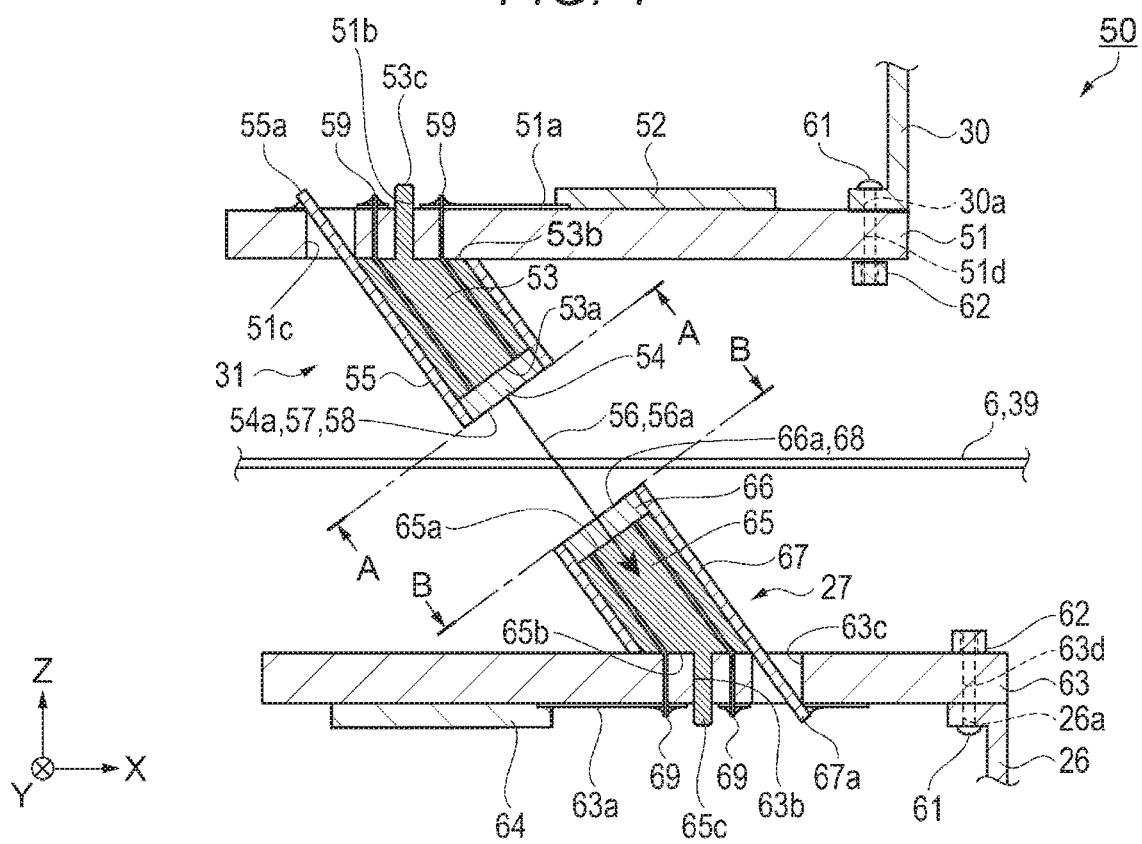
FIG. 4 is a schematic side sectional diagram showing a configuration of a multi-feed detection device.

FIG. 4 is a schematic side sectional diagram showing a structure of the multi-feed detection device, and is a diagram of the multi-feed detection device seen from the −Y direction side. As shown in FIG. 4, a multi-feed detection device 50 is installed in the transport path 39 of the paper 6. The multi-feed detection device 50 includes the ultrasonic transmitter 31 transmitting the ultrasonic wave 56 and the ultrasonic receiver 27 receiving the ultrasonic wave 56. The multi-feed detection device 50 includes a transmission circuit substrate 51 as a substrate, and the ultrasonic transmitter 31 transmitting an ultrasonic wave is installed on the transmission circuit substrate 51. In addition, a transmission drive circuit 52 for driving the ultrasonic transmitter 31 and a wiring 51*a* are also disposed on the transmission circuit substrate 51.

The ultrasonic transmitter 31 includes a transmission pedestal 53. The shape of the transmission pedestal 53 is not particularly limited, and it may be cylindrical, prismatic, rectangular parallelepiped, or polyhedral. In the present embodiment, for example, the shape of the transmission pedestal 53 is cylindrical. The transmission pedestal 53 has a first surface 53*a* and a second surface 53*b* facing each other. The first surface 53*a* is a surface orthogonal to the cylindrical axis, and the second surface 53*b* is a surface intersecting the cylindrical axis. A transmission element substrate 54 is installed on the first surface 53*a*. The second surface 53*b* is fixed in contact with the transmission circuit substrate 51.

In the transmission pedestal 53, two cylindrical projection portions 53*c* are installed side by side in the Y direction on the second surface 53*b*. Two through-holes 51*b* are installed side by side in the Y direction on the transmission circuit substrate 51. Two projection portions 53*c* are inserted into two through-holes 51*b*, respectively. The transmission pedestal 53 is disposed on the transmission circuit substrate 51 with high positional accuracy by the projection portions 53*c* and the through-holes 51*b*.

A transmission shield 55 is installed on a side surface of the transmission pedestal 53. The shape of the transmission shield 55 is not particularly limited as long as it surrounds the transmission pedestal 53. The shape of the transmission shield 55 may be, for example, a cylindrical shape, a rectangular tube shape, a shape along a rectangular parallelepiped, a shape along a polyhedron, or the like. In the present embodiment, for example, the shape the transmission shield 55 is a cylindrical shape. The transmission shield 55 has a projection portion 55*a* installed on the transmission circuit substrate 51 side. A single through-hole 51*c* is installed on the transmission circuit substrate 51. The projection portion 55*a* is inserted into the through-hole 51*c*. The projection portion 55*a* is soldered to the wiring 51*a*. The transmission shield 55 is chassis grounded via the wiring 51*a*, and the transmission element substrate 54 is shielded against static electricity and magnetic noise.

A surface of the transmission element substrate 54 facing the ultrasonic receiver 27 is referred to as a transmission surface 54*a*. An ultrasonic element group 58 including an ultrasonic transmission element 57 as ultrasonic elements driven by the same drive signal is installed on the transmission surface 54*a*. Then, the ultrasonic wave 56 is transmitted from the ultrasonic transmission elements 57. An advancing direction 56*a* of the ultrasonic wave is in a direction orthogonal to the transmission surface 54*a*, and is heading to the ultrasonic receiver 27.

A rod-like drive wiring 59 is installed in the transmission pedestal 53. The drive wiring 59 is connected to each ultrasonic transmission element 57. The drive wiring 59 is electrically coupled to the transmission drive circuit 52 via the wiring 51*a*. The transmission drive circuit 52 supplies the drive voltage waveform to the ultrasonic transmission element 57 via the wiring 51*a* and the drive wiring 59. The ultrasonic transmission element vibrates according to the drive voltage waveform and transmits the ultrasonic wave 56. A flexible printed circuit (FPC) may be used instead of the rod-like drive wiring 59.

The transmission circuit substrate 51 includes a through-hole 51*d* on the +X direction side. A through-hole 30*a* is also installed on the third support portion 30. A screw 61 is inserted into the through-hole 51*d* and the through-hole 30*a* and is fixed by a nut 62.

The multi-feed detection device 50 includes a receiving circuit substrate 63, and the ultrasonic receiver receiving the ultrasonic wave 56 is installed on the receiving circuit substrate 63. In addition, a receiving drive circuit 64 for driving the ultrasonic receiver 27 and a wiring 63*a* are disposed on the receiving circuit substrate 63.

The ultrasonic receiver 27 includes a receiving pedestal 65. The shape of the receiving pedestal 65 is not particularly limited, and it may be cylindrical, prismatic, rectangular parallelepiped, or polyhedral. In the present embodiment, for example, the shape of the receiving pedestal 65 is cylindrical. The receiving pedestal 65 has a first surface 65*a* and a second surface 65*b* facing each other. The first surface 65*a* is a surface orthogonal to the cylindrical axis, and the second surface 65*b* is a surface intersecting the cylindrical axis. A receiving element substrate 66 is installed on the first surface 65*a*. The second surface 65*b* is fixed in contact with the receiving circuit substrate 63.

Two cylindrical projection portions 65*c* are installed side by side in the Y direction on the second surface 65*b* of the receiving pedestal 65. Two through-holes 63*b* are installed side by side in the Y direction on the receiving circuit substrate 63. Two projection portions 65*c* are inserted into two through-holes 63*b*, respectively. The receiving pedestal 65 is disposed on the receiving circuit substrate 63 with high positional accuracy by the projection portions 65*c* and the through-holes 63*b*.

A receiving shield 67 is installed on a side surface of the receiving pedestal 65. The shape of the receiving shield 67 is not particularly limited as long as it surrounds the receiving pedestal 65. The shape of the receiving shield 67 may be, for example, a cylindrical shape, a rectangular tube shape, a shape along a rectangular parallelepiped, a shape along a polyhedron, or the like. In the present embodiment, for example, the shape of the receiving shield 67 is a cylindrical shape. The receiving shield 67 has a projection portion 67*a* installed on the receiving circuit substrate 63 side. One through-hole 63*c* is installed on the receiving circuit substrate 63. The projection portion 67*a* is inserted into the through-hole 63*c*. The projection portion 67*a* is soldered to the wiring 63*a*. The receiving shield 67 is chassis grounded via the wiring 63*a*, and the receiving element substrate 66 is shielded against static electricity and magnetic noise.

A surface of the receiving element substrate 66 facing the ultrasonic transmitter 31 is referred to as a receiving surface 66*a*. The receiving surface 66*a* is a surface on which the ultrasonic receiver 27 receives the ultrasonic wave 56. Ultrasonic receiving elements 68 as ultrasonic elements receiving the ultrasonic wave 56 are arranged in a matrix on the receiving surface 66*a*. Each ultrasonic receiving element 68 receives the ultrasonic wave 56. Accordingly, the ultrasonic receiver 27 has a plurality of ultrasonic receiving elements 68 receiving the ultrasonic wave 56.

A rod-like receiving element wiring 69 is installed in the receiving pedestal 65. The receiving element wiring 69 is connected to each ultrasonic receiving element 68. The receiving element wiring 69 is electrically connected to the receiving drive circuit 64 via the wiring 63*a*. The receiving drive circuit 64 receives the reception voltage waveform output from the ultrasonic receiving elements 68 via the wiring 63*a* and the receiving element wiring 69. Two receiving element wirings 69 are shown for visibility of FIG.

4, but the number of receiving element wirings 69 may be three or more. An FPC may be used instead of the rod-like receiving element wiring 69.

The receiving circuit substrate 63 includes a through-hole 63d on the +X direction side. A through-hole 26a is also installed on the second support portion 26. The screw 61 is inserted into the through-hole 63d and the through-hole 26a and are fixed by the nut 62.

The paper 6 is transported between the ultrasonic receiver 27 and the ultrasonic transmitter 31. The ultrasonic transmitter 31 transmits the ultrasonic wave 56 in a direction intersecting a thickness direction of the transmission circuit substrate 51. Thereby, the ultrasonic receiver 27 receives the ultrasonic wave 56 passed through the paper 6.

Figure 5:
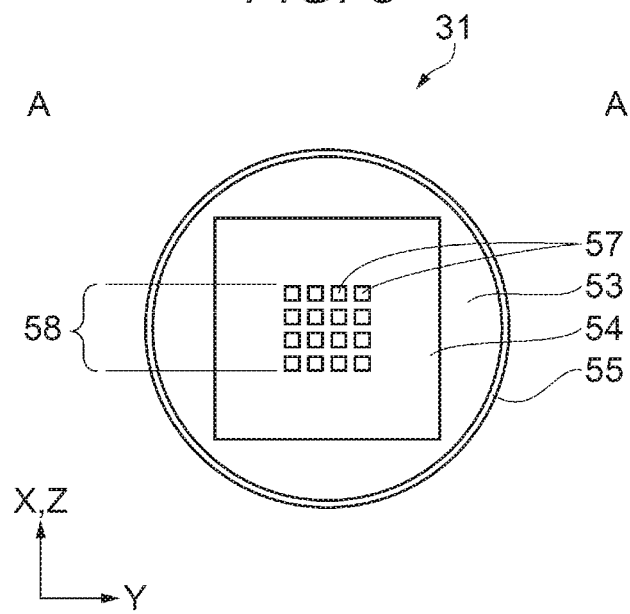
FIG. 5 is a schematic diagram for explaining a transmission surface of an ultrasonic transmitter.

FIG. 5 is a schematic diagram for explaining a transmission surface of an ultrasonic transmitter, and is a diagram as seen from a side of a surface along line A-A of FIG. 4. As shown in FIG. 5, one ultrasonic element group 58 is installed on the transmission element substrate 54, and the ultrasonic transmission elements 57 are arranged in a matrix in the ultrasonic element group 58. The number of ultrasonic transmission elements 57 in the ultrasonic element group 58 may be two or more and is not particularly limited. For example, in the present embodiment, 16 ultrasonic transmission elements 57 of four rows and four columns are arranged in the ultrasonic element group 58. Each ultrasonic transmission element 57 is driven by the same drive signal. In this way, the ultrasonic transmitter includes one ultrasonic element group 58 including ultrasonic transmission elements 57 driven by the same drive signal. Each ultrasonic transmission element 57 transmits a spherical ultrasonic wave 56. In the ultrasonic element group 58, the plurality of ultrasonic transmission elements 57 transmit the ultrasonic waves 56 of the same phase. Here, the ultrasonic wave 56 transmitted from the ultrasonic element group 58 has directivity, and the sound pressure in the advancing direction 56a of the ultrasonic wave 56 becomes stronger than in the other direction.

Figure 6:
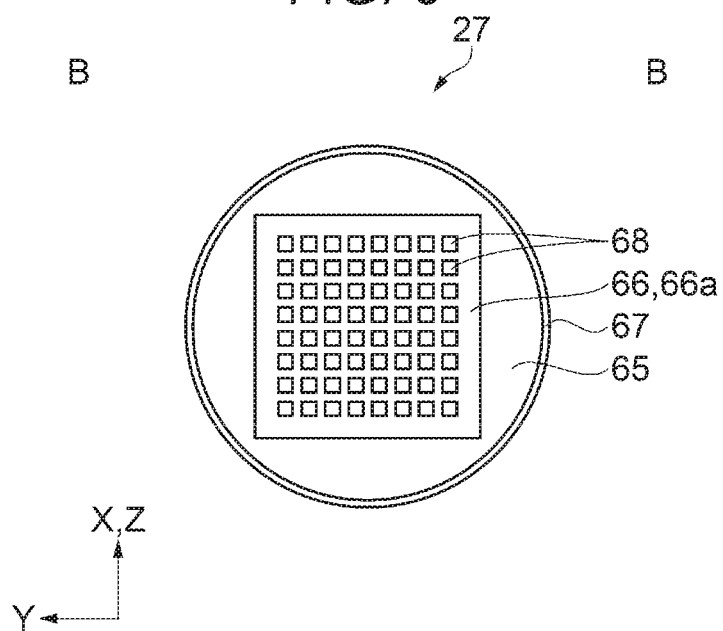
FIG. 6 is a schematic diagram for explaining a disposition of an ultrasonic receiving element in an ultrasonic receiver.

FIG. 6 is a schematic diagram for explaining a disposition of the ultrasonic receiving element in the ultrasonic receiver, and is a diagram as seen from a side of a surface along line B-B of FIG. 4. As shown in FIG. 6, the ultrasonic receiving elements 68 are arranged in a matrix on the receiving element substrate 66. In the present embodiment, the ultrasonic receiving elements 68 of eight rows and eight columns are assumed to be disposed on the receiving element substrate 66 in order to facilitate understanding of FIG. 6 and description. The number of ultrasonic receiving elements 68 installed on the receiving element substrate 66 is not particularly limited. For example, 100 ultrasonic receiving elements 68 of 10 rows and 10 columns may be disposed on the receiving element substrate 66.

Figure 7:
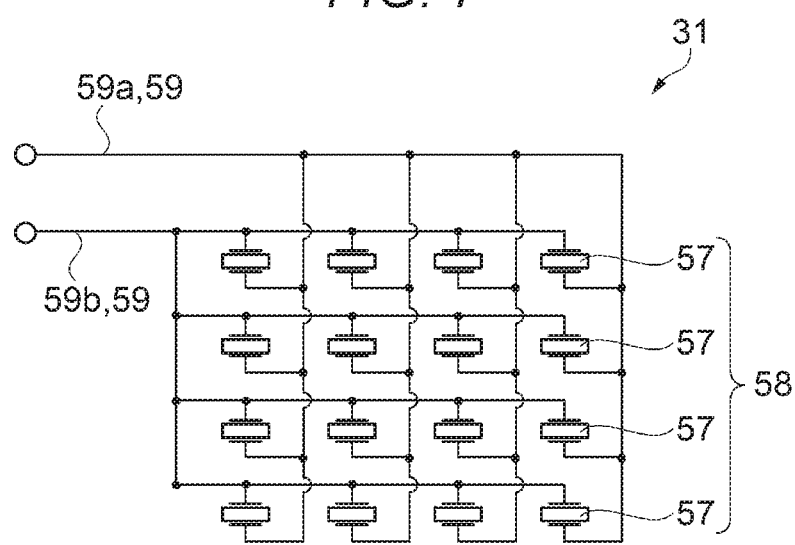
FIG. 7 is an electric circuit diagram of the ultrasonic transmitter.

FIG. 7 is an electric circuit diagram of the ultrasonic transmitter. As shown in FIG. 7, the ultrasonic transmission elements 57 arranged in a matrix have two electrodes. One of the electrodes is connected to a first wiring 59a, and the other electrode is connected to a second wiring 59b. That is, the plurality of ultrasonic transmission elements 57 are connected in parallel and disposed on the transmission surface 54a. Here, in the ultrasonic element group 58, the plurality of ultrasonic transmission elements 57 are electrically connected with the common drive wiring 59, the ultrasonic transmission elements 57 are driven by the same drive signal.

Figure 8:
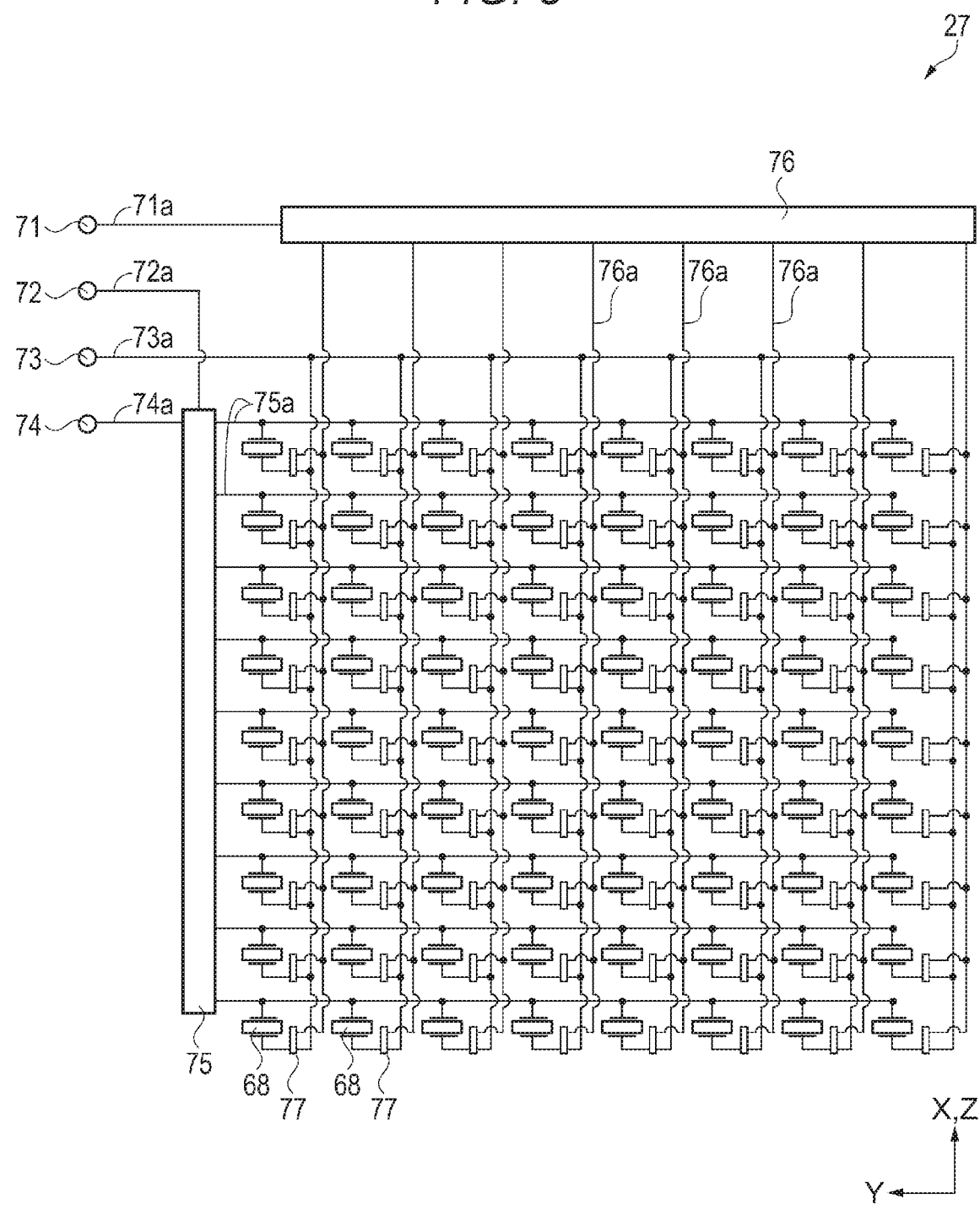
FIG. 8 is an electric circuit diagram of the ultrasonic receiver.

FIG. 8 is an electric circuit diagram of the ultrasonic receiver. As shown in FIG. 8, the ultrasonic receiver 27 includes a first terminal 71, a second terminal 72, a third terminal 73, and a fourth terminal 74. The first terminal 71 to the fourth terminal 74 are electrically connected to the receiving drive circuit 64 via the receiving element wiring 69 and the wiring 63a. The ultrasonic receiver 27 also includes a row wiring switching unit 75 and a column wiring switching unit 76. The first terminal 71 is electrically connected to the column wiring switching unit 76 by a first wiring 71a. The second terminal is electrically connected to the row wiring switching unit 75 by a second wiring 72a. The fourth terminal 74 is electrically connected to the row wiring switching unit 75 by a fourth wiring 74a.

The ultrasonic receiver 27 includes a plurality of ultrasonic receiving elements 68 and switching elements 77, and the ultrasonic receiving elements 68 and the switching elements 77 are arranged in a matrix. The switching elements 77 are switching elements including transistors. The ultrasonic receiving elements 68 have two electrodes. One of the electrodes is electrically connected to a row signal wiring 75a. Each ultrasonic receiving element 68 is connected to the row wiring switching unit 75 via the row signal wiring 75a.

The other electrode of each ultrasonic receiving elements 68 is connected to one switching element 77, respectively. Each switching element 77 is electrically connected to the third terminal 73 by a column signal wiring 73a. Each switching element 77 is electrically connected to the column wiring switching unit 76 by a column control wiring 76a.

The row wiring switching unit 75 receives a row control signal from the second terminal 72. The row wiring switching unit 75 electrically connects the fourth terminal 74 to one of the row signal wirings 75a of each row according to the row control signal. That is, the row wiring switching unit 75 selects the row of the ultrasonic receiving elements 68 to be driven.

The column wiring switching unit 76 receives a column control signal from the first terminal 71. The column wiring switching unit 76 short-circuits the switching elements 77 according to the column control signal. Accordingly, the column wiring switching unit 76 electrically connects the ultrasonic receiving elements 68 of one column among a plurality of columns of the ultrasonic receiving elements 68 to the third terminal 73. That is, the column wiring switching unit 76 selects the column of the ultrasonic receiving elements 68 to be driven. The ultrasonic receiver 27 receives the row control signal and the column control signal and outputs the voltage waveform of the ultrasonic signal output from the ultrasonic receiving elements 68 at the position designated by the row control signal and the column control signal to the third terminal 73 and the fourth terminal 74.

Figure 9:
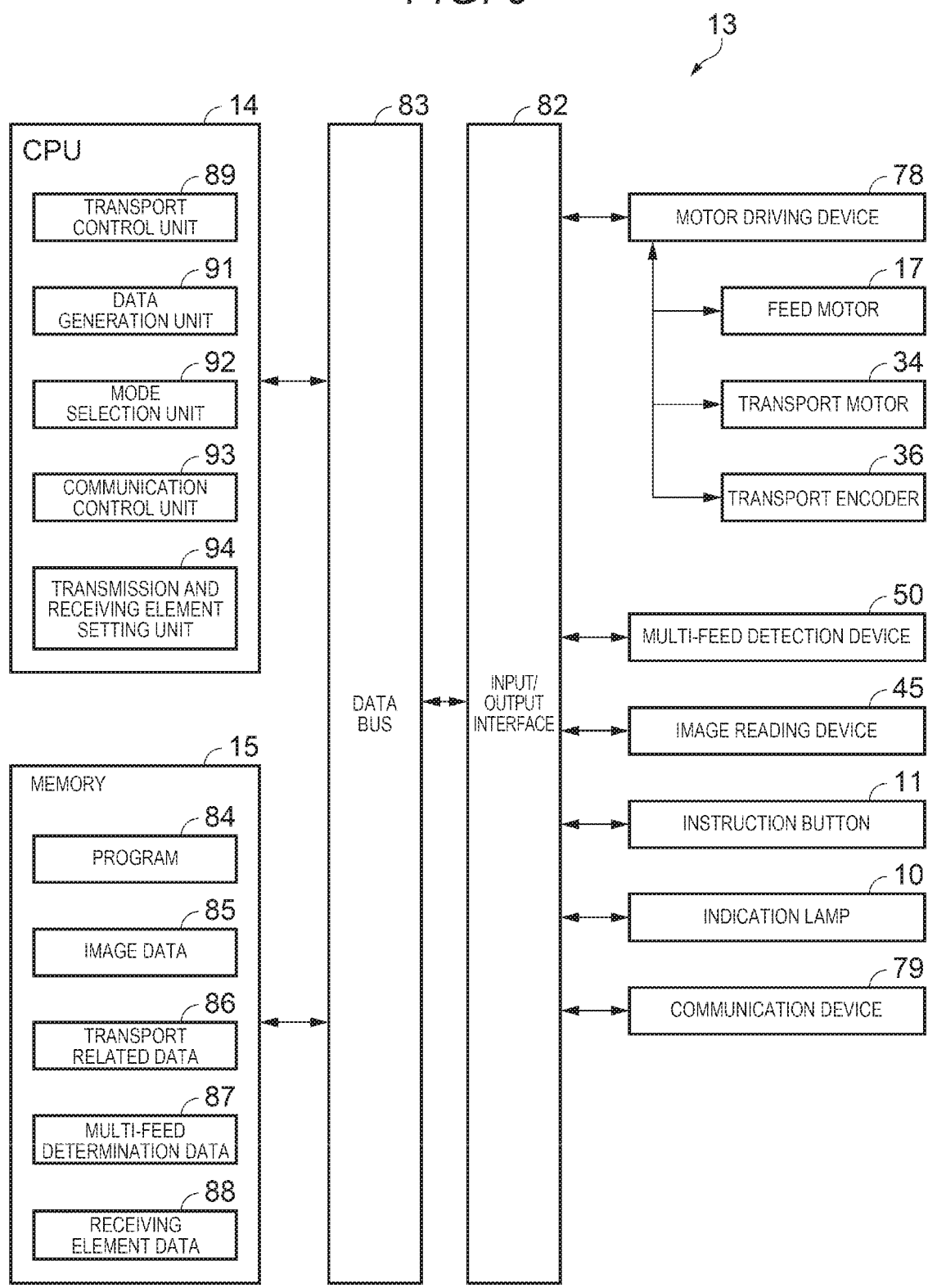
FIG. 9 is an electrical block diagram showing a configuration of a control unit.

FIG. 9 is an electrical block diagram showing a configuration of a control unit. In FIG. 9, the control unit 13 includes the CPU 14 (central processing unit) for performing various arithmetic processing as a processor and the memory 15 for storing various information. A motor driving device 78, the multi-feed detection device 50, the image reading device 45, the instruction button 11, the indication lamp 10, and a communication device 79 are connected to the CPU 14 via an input/output interface 82 and a data bus 83.

The motor driving device 78 is a circuit for driving the feed motor 17, the transport motor 34, and the transport encoder 36. The motor driving device 78 receives an instruction signal of the CPU 14. The motor driving device 78 rotates the feed motor 17 and the transport motor at a predetermined rotation angle at a predetermined rotation speed according to the instruction signal. The paper 6 is moved by the rotation of the feed motor 17 and the transport motor 34.

The motor driving device 78 converts the signal output from the transport encoder 36 into a digital data and outputs the digital signal to the CPU 14. Since the transport encoder 36 detects a moving amount of the paper 6, the CPU 14 receives the signal output from the motor driving device 78 and recognizes the position of the paper 6.

The multi-feed detection device 50 is a device installed in the transport path 39 of the paper 6 and a device which detects whether or not two or more sheets of paper 6 are overlapped. The multi-feed detection device 50 compares the intensity of the ultrasonic wave 56 received by the ultrasonic receiver 27 with a determination value to detect the multi-feed of the paper 6. The multi-feed detection device 50 outputs information indicating a multi-feed state to the CPU 14 when two or more sheets of paper 6 are transported in the transport path 39 in an overlapped manner.

The image reading device 45 is a device which reads images on front and back surfaces of the paper 6. The image reading device 45 controls the lower reading unit 42 and the upper reading unit 44 while transporting the paper 6, and reads an image on the paper 6. Specifically, the image reading device 45 outputs a pulse signal for controlling the operation timing of a reading operation of a pixel signal with respect to the contact image sensor module and the like and controls the reading operation. The analog pixel signal output from the contact image sensor module is converted into digital image data and is stored in the memory 15. The image data includes information on the density of pixels constituting the image.

The instruction button 11 includes a plurality of switches and output information indicating the switch operated by the operator to the CPU 14. The indication lamp 10 includes a plurality of light sources. The indication lamp 10 receives the instruction signal of the CPU 14. Then, the light source corresponding to the instruction signal is turned on, blinked, or turned off.

The communication device 79 is a device which communicates with an external device. The communication device 79 communicates with the external device and outputs data of the image information read from the paper 6 to the external device according to a communication protocol. The communication device 79 receives various data used at the time of reading an image and a reading start signal from an external device.

The memory 15 is a concept including a semiconductor memory such as RAM, and ROM, and an external storage device such as a hard disk. The memory 15 stores a program 84 on which a control procedure of the operation of the scanner 1 and the like are written. The memory 15 stores image data 85 which is data of an image read by the image reading device 45. The memory 15 stores transport related data 86 which is data of various parameters used when the CPU 14 transports the paper 6. The memory 15 stores multi-feed determination data 87 which is data such as a determination value used when the multi-feed detection device 50 determines whether or not the paper is in a multi-feed state. The memory 15 stores receiving element data 88 which is data such as a number of ultrasonic receiving element 68 that the ultrasonic receiver 27 receives the ultrasonic wave 56. The memory 15 includes a storage area functioning as a work area for the CPU 14, a temporary file, or the like, and other various storage areas.

The CPU 14 controls the operation of the scanner 1 according to the program 84 stored in the memory 15. The CPU 14 has various functional units for realizing functions. The CPU 14 has a transport control unit 89 as a specific functional unit. The transport control unit 89 controls a moving speed, the moving amount, a moving position, and the like of the paper 6. The transport control unit 89 outputs a parameter for controlling the transport of the paper 6 to the motor driving device 78. The transport control unit 89 outputs an instruction signal for starting and stopping the transport of the paper 6 to the motor driving device 78. The motor driving device 78 transports the paper 6 to the feed roller 21, the pair of transport rollers 38, and the pair of discharge rollers 49 according to the instruction signal output from the transport control unit 89.

The CPU 14 has a data generation unit 91. The data generation unit 91 performs correction processing such as shading correction and gamma correction with respect to the received digital image data 85, and generates the image data 85 for the output of paper 6.

The CPU 14 has a mode selection unit 92. The instruction button 11 includes one multi-feed detection switching switch. The mode selection unit 92 sets, for example, either an enable mode which enables multi-feed detection or a disable mode which disables the multi-feed detection of the multi-feed detection device 50 according to the instruction from the multi-feed detection switching switch.

The CPU 14 has a communication control unit 93. The communication control unit 93 communicates with an external device via the communication device 79. The communication control unit 93 receives an instruction signal from an external device and starts an operation such as reading. The communication control unit 93 converts the image data 85 into a data format to be communicated, and outputs the converted data to the communication device 79. The image data 85 is transmitted to the external device via the communication device 79.

The CPU 14 has a transmission and receiving element setting unit 94. The transmission and receiving element setting unit 94 checks the intensity of the ultrasonic wave 56 received by the arrayed ultrasonic receiving elements 68. The transmission and receiving element setting unit 94 specifies and sets the ultrasonic receiving element 68 suitable for receiving the ultrasonic wave 56 among the arrayed ultrasonic receiving elements 68. In this way, the transmission and receiving element setting unit 94 of the control unit 13 sets the ultrasonic receiving element 68 to be operated among the plurality of ultrasonic receiving elements 68.

The CPU 14 has a functional unit (not shown). For example, the CPU 14 performs control to display information related to device status display or reading on the indication lamp 10. The CPU 14 performs control to notify abnormality with the indication lamp 10 when the abnormality occurs in the scanner 1.

Figure 10:
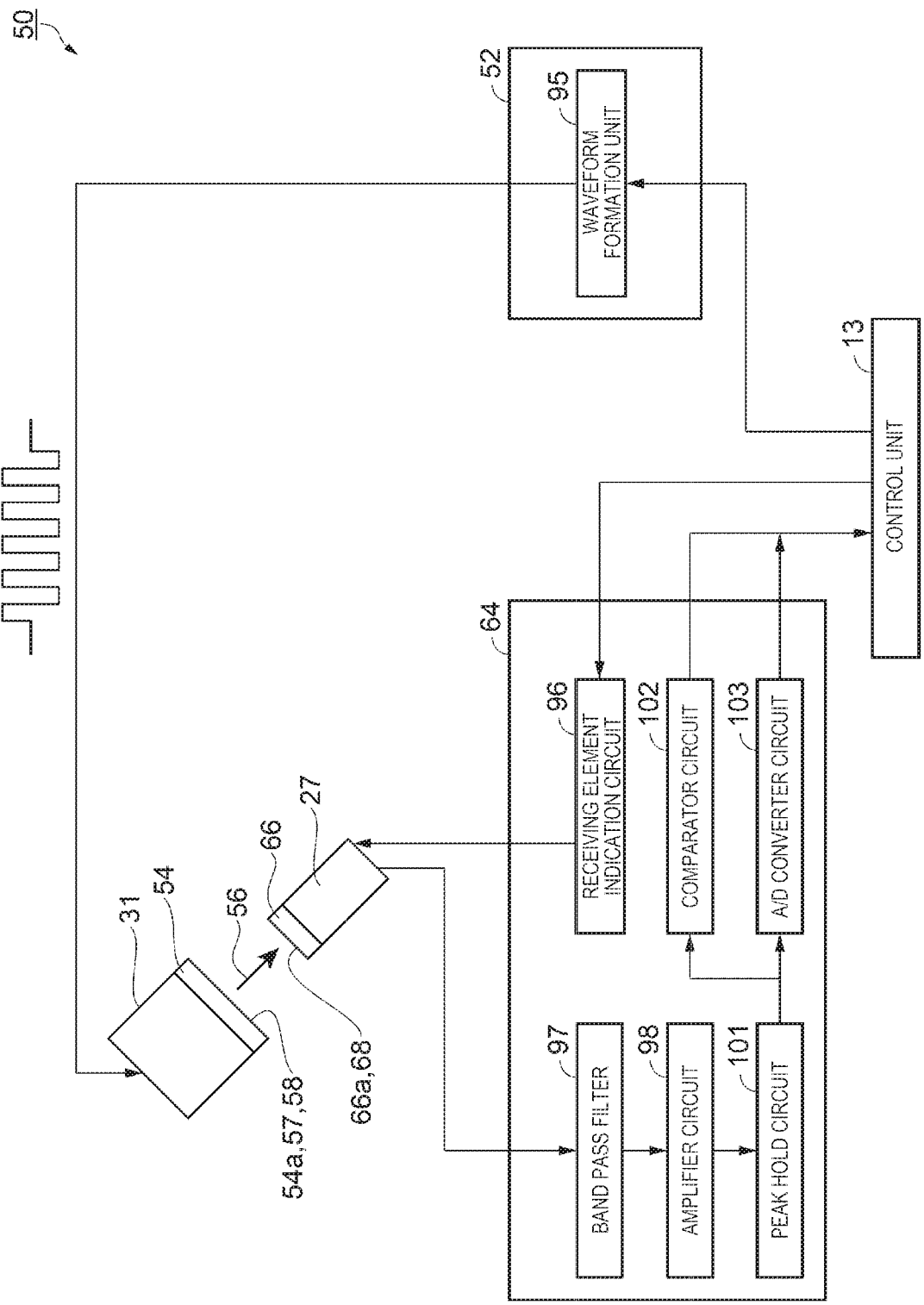
FIG. 10 is an electrical block diagram showing a configuration of the multi-feed detection device.

FIG. 10 is an electrical block diagram showing a configuration of the multi-feed detection device. As shown in FIG. 10, the transmission drive circuit 52 is electrically connected to the control unit 13. The transmission drive circuit 52 includes a waveform formation unit 95. In the transmission drive circuit 52, the waveform formation unit 95 forms a drive waveform for driving and outputs the waveform to the ultrasonic transmission element 57. The drive waveform is a waveform matching the characteristics of the ultrasonic transmission elements 57, and is not particularly limited. In the present embodiment, the drive waveform is, for example, a burst wave having a voltage amplitude of 24 V and a frequency of 300 KHz. The ultrasonic element group 58 including 16 ultrasonic transmission elements 57 receives the drive waveform and simultaneously transmits the ultrasonic wave 56.

The receiving drive circuit 64 includes a receiving element indication circuit 96. In the control unit 13, the transmission and receiving element setting unit outputs the data indicating the number of ultrasonic receiving element 68 to be driven to the receiving element indication circuit 96. The receiving element indication circuit 96 stores the number of ultrasonic receiving element 68 to be driven and outputs a signal indicating the row number of the ultrasonic receiving element 68 to be driven to the row wiring switching unit 75 of the ultrasonic receiver 27. The receiving element indication circuit 96 outputs a signal indicating a column number of the ultrasonic receiving element 68 to be driven to the column wiring switching unit 76.

The ultrasonic receiving element 68 installed on the receiving surface 66a of the receiving element substrate 66 receives the ultrasonic wave 56 and outputs the voltage waveform to the receiving drive circuit 64. Here, the ultrasonic receiver 27 outputs the voltage waveform of an ultrasonic signal output by the ultrasonic receiving element 68 of the indicated row number and column number to the receiving drive circuit 64.

The receiving drive circuit 64 includes a band pass filter 97, and the band pass filter 97 receives the voltage waveform from the ultrasonic receiving element 68. The center frequency of the band pass filter 97 is 300 KHz, and the band pass filter 97 has a function of removing noise components other than the waveform corresponding to the ultrasonic wave 56 from the voltage waveform.

An amplifier circuit 98 is disposed in electrical connection with the band pass filter 97. The amplifier circuit 98 amplifies the voltage waveform received from the band pass filter 97 to substantially 10,000 times. As the amplifier circuit 98 amplifies the voltage waveform, the influence of noise can be reduced and easily operated. A peak hold circuit 101 is disposed in electrical connection with the amplifier circuit 98. The peak hold circuit 101 detects the maximum amplitude of the burst signal of the voltage waveform.

A comparator circuit 102 and an analog-to-digital converter 103 (A/D converter circuit) are disposed in electrical connection with the peak hold circuit 101. The comparator circuit 102 compares the multi-feed determination data 87 stored in the memory 15 with the maximum amplitude of the burst signal. Then, the determination result is output to the control unit 13. When multi-feed occurs, the CPU 14 blinks one indication lamp 10 to notify the operator that multi-feed has occurred.

The A/D converter circuit 103 converts the maximum amplitude of the burst signal into digital data. The maximum amplitude of the burst signal converted into digital data is output to the CPU 14 as one of the receiving element data 88. The maximum amplitude of the burst signal changes when the medium transported through the transport path 39 is changed from the paper 6. The operator can reset the multi-feed determination data 87 of the predetermined medium with reference to the maximum amplitude of the burst signal. Accordingly, the multi-feed detection device 50 can determine multi-feed even when the paper 6 is replaced with another medium.

Figure 11:
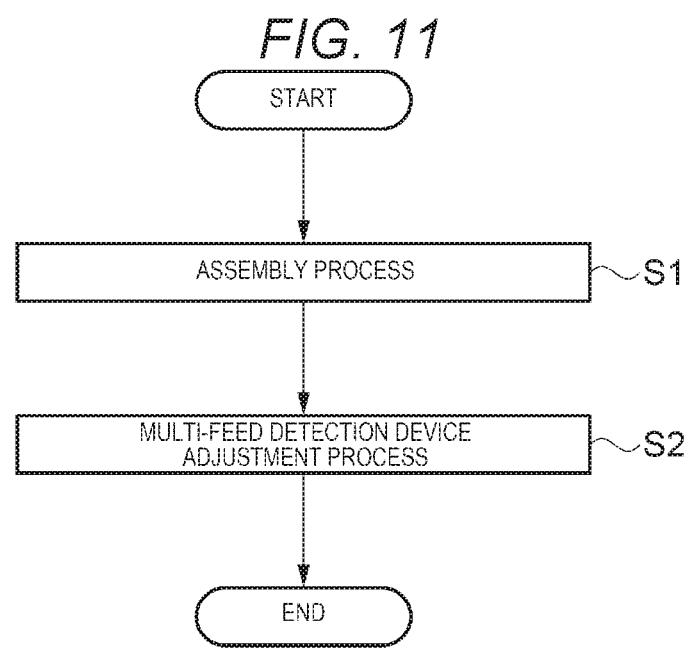
FIG. 11 is a flowchart of an assembly adjustment method.

Next, the assembly adjustment method and multi-feed detection method of the above-described scanner 1 will be described with reference to FIGS. 11 to 16. FIG. 11 is a flowchart of the assembly adjustment method. FIGS. 12 to 16 are diagrams for explaining the assembly adjustment method. In the flowchart of FIG. 11, step S1 is an assembly process. This process is a process of assembling the scanner 1. Next, the procedure proceeds to step S2. Step S2 is a multi-feed detection device adjustment process. The method of performing step S2 is a part of the multi-feed detection method. This process is a process of adjusting the positional deviation of the multi-feed detection device 50. The assembly adjustment process is ended in the above steps. Multi-feed detection is performed after the assembly adjustment process.

Next, the assembly adjustment method will be described in detail in correspondence with steps shown in FIG. 11 using FIG. 2 and FIGS. 12 to 16.

Figure 13:
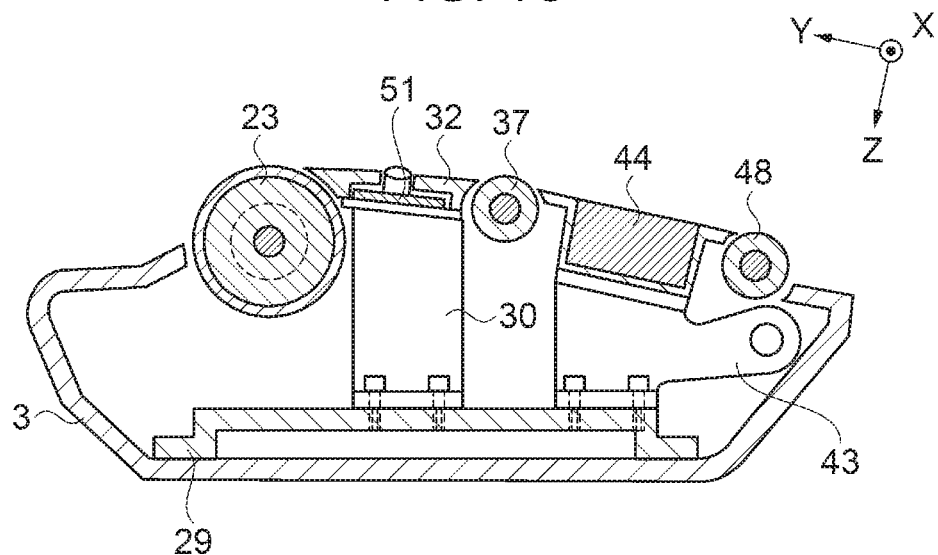
FIG. 13 is a schematic diagram for explaining the assembly adjustment method.

FIGS. 2, 12, and 13 are diagrams corresponding to the assembly process of step S1. As shown in FIG. 12, the lower substrate 12 is fixed on the bottom surface inside the lower case 2 with screws. Next, the transport motor 34 and the control unit 13 are fixed on the lower substrate 12 with screws.

Next, the lower reading unit 42 is fixed to the fourth support portion 41 with screws. Then, the fourth support portion 41 is fixed to the lower substrate 12 with screws. Next, the receiving circuit substrate 63 and the midstream lower guide portion 28 are fixed to the second support portion 26 with screws. Then, the second support portion 26 is fixed to the lower substrate 12 with screws. Next, the feed motor 17 is fixed to the first support portion 16 with screws. Then, the first support portion 16 is fixed to the lower substrate 12 with screws. Next, a sixth support portion 104 supporting the hinge 4 is fixed to the lower substrate 12 with screws.

Next, a lower plate (not shown) is temporarily installed on the lower substrate 12. The lower plate is installed on the +X direction side and the −X direction side of the lower substrate 12. Bearings of the discharge drive roller 46, the third wheel train 47, the transport drive roller 33, the second wheel train 35, the first wheel train 18, and the feed roller 21 are installed on the lower plate. Next, the discharge drive roller 46, the third wheel train 47, the transport drive roller 33, the second wheel train 35, the first wheel train 18, and the feed roller 21 are installed on each bearing on the lower plate. Next, the lower plate is fixed to the lower substrate 12 with screws. Next, the cover portion 5, the upstream guide portion 22, and the like are installed on the lower case 2.

As shown in FIG. 13, the upper substrate 29 is fixed on the bottom surface inside the upper case 3 with screws. Next, the upper reading unit 44 is fixed to the fifth support portion 43 with screws. Then, the fifth support portion 43 is fixed to the upper substrate 29 with screws. Next, the transmission circuit substrate 51 and the midstream upper guide portion 32 are fixed to the third support portion 30 with screws. Then, the third support portion 30 is fixed to the upper substrate 29 with screws.

Next, an upper plate (not shown) is temporarily installed on the upper substrate 29. The upper plate is installed on the +X direction side and the −X direction side of the upper substrate 29. Bearings of the separation roller 23, the transport driven roller 37, and the discharge driven roller 48 are installed on the upper plate. Next, the separation roller 23, the transport driven roller 37, and the discharge driven roller 48 are installed on each bearing on the upper plate. Next, the upper plate is fixed to the upper substrate 29 with screws. Next, the fifth support portion 43 and the sixth support portion 104 are rotatably fixed to the hinge 4 with screws. As a result, the scanner 1 shown in FIG. 2 is assembled.

Figure 14:
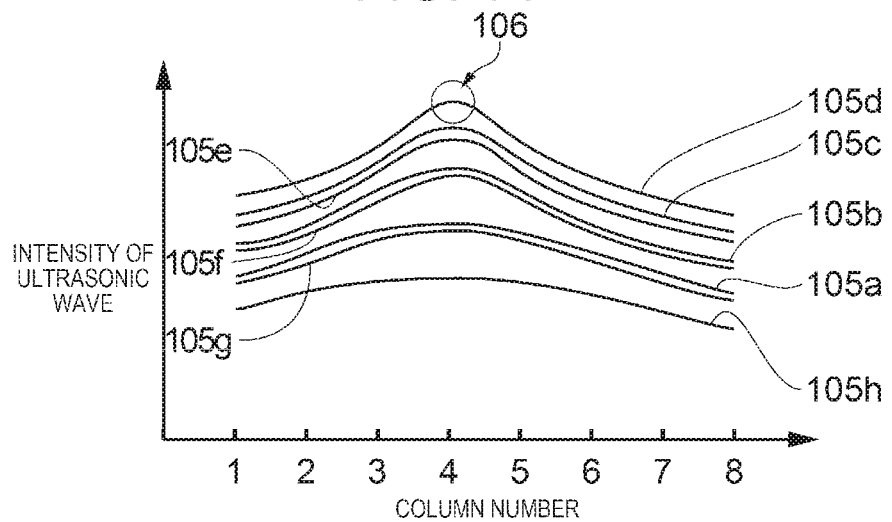
FIG. 14 is a graph for explaining the assembly adjustment method.
Figure 15:
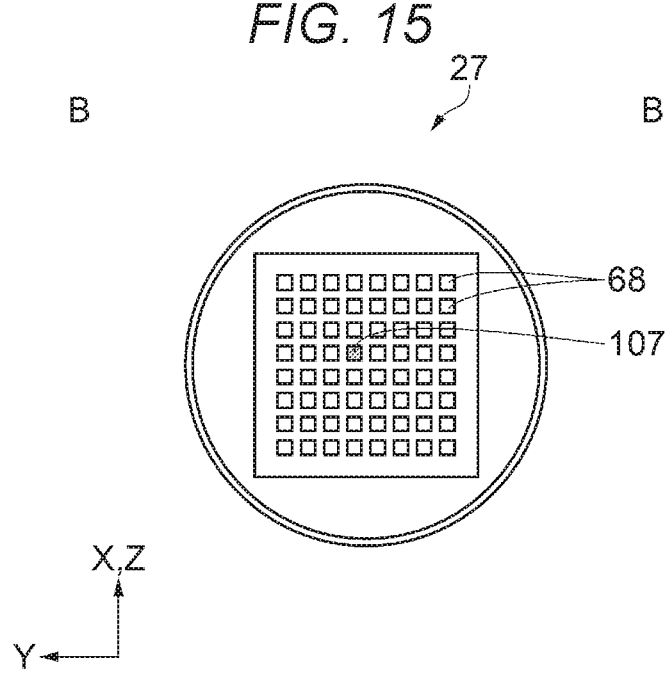
FIG. 15 is a schematic diagram for explaining the assembly adjustment method.
Figure 16:
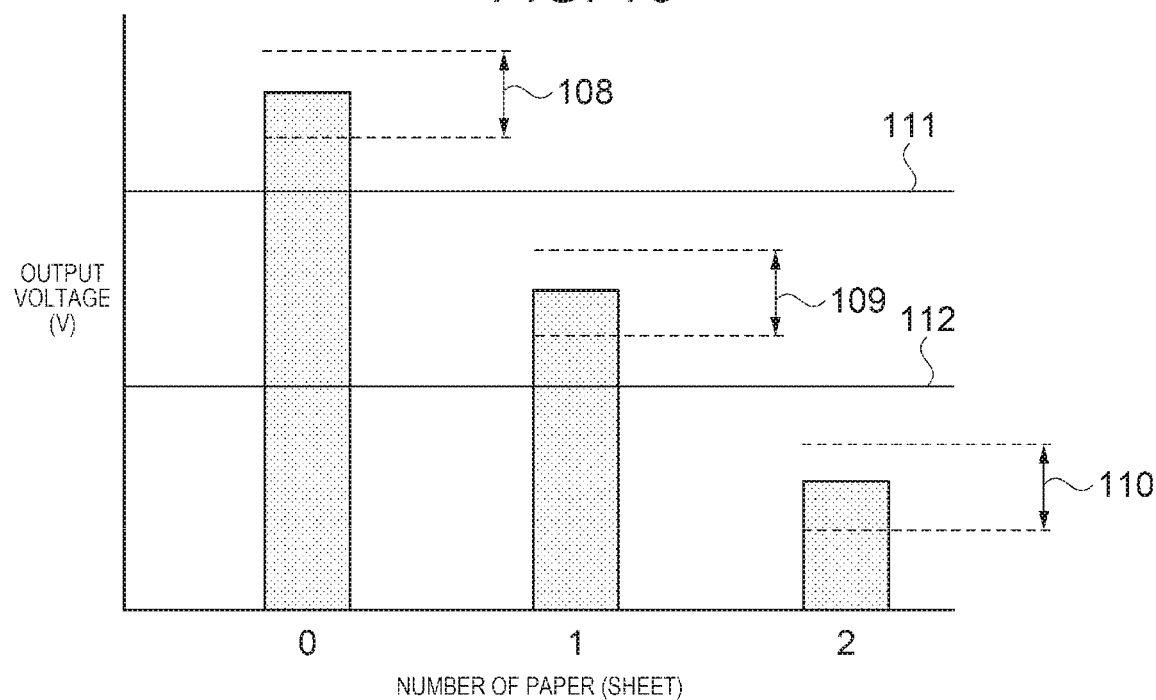
FIG. 16 is a graph for explaining the assembly adjustment method.

FIGS. 14 to 16 are diagrams corresponding to the multi-feed detection device adjustment process of step S2. In step S2, which is a part of the multi-feed detection method, the ultrasonic wave 56 is transmitted from the ultrasonic transmitter 31 toward the ultrasonic receiver 27. The intensity distribution of the ultrasonic wave 56 shows directivity in the advancing direction 56a of the ultrasonic wave.

The receiving element setting unit 94 selects the ultrasonic receiving element 68 which outputs the intensity of the ultrasonic wave 56. The receiving element setting unit 94 outputs the data indicating the number of ultrasonic receiving element 68 to be driven to the receiving element indication circuit 96. Specifically, the transmission and receiving element setting unit 94 designates from the first to eighth columns of the first row. Thereafter, the transmission and receiving element setting unit 94 sequentially designates the second to eighth rows of the first to eighth columns. The transmission and receiving element setting unit 94 outputs data indicating the intensity of the ultrasonic wave 56 from all of the ultrasonic receiving elements 68 and stores the data in the memory 15 as the receiving element data 88.

FIG. 14 shows an example of the intensity distribution of the ultrasonic wave 56 received by each ultrasonic receiving element 68 of the ultrasonic receiver 27. The intensity distribution of the ultrasonic wave 56 is a distribution depending on the relative position between the ultrasonic transmitter 31 and the ultrasonic receiver 27. Then, in the ultrasonic receiver 27, the plurality of ultrasonic receiving elements 68 receive the ultrasonic waves 56. A first row distribution 105*a* to an eighth row distribution 105*h* show an example of the receiving element data 88.

The vertical axis in FIG. 14 indicates the intensity of the ultrasonic waves 56 received by the ultrasonic receiving elements 68. The horizontal axis indicates the column numbers of ultrasonic receiving elements 68. In FIG. 6, the column numbers are set in order from the first column to the eighth column from +Y side to −Y side. The row numbers are set in order from the first row to the eighth row from +X side to −X side.

Returning to FIG. 14, the first row distribution 105*a* is the intensity distribution of the ultrasonic waves 56 received by the ultrasonic receiving elements 68 in the first row. Similarly, the second row distribution 105*b* to the eighth row distribution 105*h* are the intensity distributions of the ultrasonic waves 56 received by the ultrasonic receiving elements 68 in the second to eighth rows, respectively. Among the first row distribution 105*a* to the eighth row distribution 105*h*, the fourth row distribution 105*d* is the distribution of the ultrasonic wave with the strongest intensity. In the fourth row distribution 105*d*, there is a peak 106 in the fourth column among the first to eighth columns. Accordingly, in the ultrasonic receiver 27, the ultrasonic receiving element 68 in the fourth row and the fourth column is receiving the ultrasonic wave 56 with the highest sensitivity. The transmission and receiving element setting unit 94 analyzes the first row distribution 105*a* to the eighth row distribution 105*h* and specifies the ultrasonic receiving element 68 which can receive the ultrasonic wave 56 with high sensitivity. That is, in the ultrasonic receiver 27, the plurality of ultrasonic receiving elements 68 receive the ultrasonic wave 56 and the optimum ultrasonic receiving element which is the ultrasonic receiving element 68 which received the ultrasonic wave 56 with the strongest intensity is specified.

As shown in FIG. 15, the transmission and receiving element setting unit 94 sets the ultrasonic receiving element 68 in the fourth row and the fourth column which can receive the ultrasonic wave 56 with high sensitivity as an optimum ultrasonic receiving element 107 receiving the ultrasonic wave 56 with the strongest intensity. An electrical signal corresponding to the intensity of the ultrasonic wave 56 is output from the set ultrasonic receiving element 68 to the receiving drive circuit 64. As described above, the ultrasonic receiver 27 receives the ultrasonic wave 56 transmitted from the ultrasonic transmitter 31, and the ultrasonic receiver 27 outputs an electrical signal corresponding to the intensity of the ultrasonic wave 56 from the optimum ultrasonic receiving element 107 which is the ultrasonic receiving element 68 which receives the ultrasonic wave 56 with the strongest intensity, among the plurality of ultrasonic receiving elements 68.

Even when the relative position between the ultrasonic transmitter 31 and the ultrasonic receiver 27 varies when the ultrasonic transmitter 31 and the ultrasonic receiver 27 are assembled, it is possible to output an electrical signal corresponding to the ultrasonic wave 56 from the optimum ultrasonic receiving element 107 which receives the ultrasonic wave 56 with the strongest intensity. Accordingly, in step S1, the transmission circuit substrate 51 and the ultrasonic receiver 27 may be assembled so as to irradiate any one of the ultrasonic receiving elements 68 with the ultrasonic wave 56 with the strongest intensity transmitted by the ultrasonic transmitter 31. As a result, it is possible to assemble the transmission circuit substrate 51 and the ultrasonic receiver 27 without requiring the positional accuracy of the relative position.

FIG. 16 is a graph for explaining the output voltage of the peak hold circuit in each number of sheets of paper 6. In FIG. 16, a vertical axis shows the output voltage of the peak hold circuit 101. A horizontal axis shows the number of paper 6 passing through the ultrasonic transmitter 31. When the number of paper 6 is zero, that is, when there is no paper 6 between the ultrasonic receiver 27 and the ultrasonic transmitter 31, the output voltage of the peak hold circuit 101 is high. When the number of paper 6 increases, the output voltage decreases.

A first setting range 108 which is a setting range of the output voltage when the number of paper 6 is zero is set. When the optimum ultrasonic receiving element 107 receives the ultrasonic wave 56 with the strongest intensity in the distribution of the ultrasonic waves 56 transmitted by the ultrasonic transmitter 31, the output voltage of the peak hold circuit 101 is set to fall within the first setting range 108. Since the relative positions of the transmission circuit substrate 51 and the ultrasonic receiver 27 may be assembled so that the ultrasonic wave 56 with the strongest intensity in the distribution of the ultrasonic waves 56 transmitted by the ultrasonic transmitter 31 falls within the range where the ultrasonic receiving element 68 is installed, the transmission circuit substrate 51 and the ultrasonic receiver 27 can be easily assembled.

The transmission circuit substrate 51 and the ultrasonic receiver 27 are assembled such that the output voltage of the peak hold circuit 101 falls within the first setting range 108. Then, the output voltage of the peak hold circuit 101 when the number of paper 6 is one falls below the first setting range 108 and falls within a first voltage range 109. The output voltage of the peak hold circuit 101 when the number of paper 6 is two falls below the first voltage range 109 and falls within a second voltage range 110.

The intermediate voltage between the lower limit voltage of the first setting range 108 and the upper limit voltage of the first voltage range 109 is referred to as a presence determination voltage 111. The comparator circuit 102 compares the output voltage of the peak hold circuit 101 with the presence determination voltage 111. When the output voltage of the peak hold circuit 101 is higher than the presence determination voltage 111, the comparator circuit 102 outputs a signal indicating that there is no paper 6 between the ultrasonic receiver 27 and the ultrasonic transmitter 31 to the control unit 13.

The intermediate voltage between the lower limit voltage of the first voltage range 109 and the upper limit voltage of the second voltage range 110 is referred to as a multi-feed determination voltage 112. The comparator circuit 102 compares the output voltage of the peak hold circuit 101 with the multi-feed determination voltage 112. When the output voltage of the peak hold circuit 101 is lower than the multi-feed determination voltage 112, the comparator circuit 102 outputs a signal indicating that there are two or more sheets of paper 6 between the ultrasonic receiver 27 and the ultrasonic transmitter 31 to the control unit 13.

As shown in FIG. 4, the ultrasonic transmitter 31 transmits the ultrasonic wave 56 to the sheet-like paper 6 passing between the ultrasonic transmitter 31 and the ultrasonic receiver 27. Then, the optimum ultrasonic receiving element 107 receives the ultrasonic wave 56 passed through the paper 6. Next, the comparator circuit 102 detects the number of paper 6 from the intensity of the ultrasonic wave 56 received by the optimum ultrasonic receiving element 107.

Since the transmission and receiving element setting unit 94 sets the optimum ultrasonic receiving element 107 so that the output voltage of the peak hold circuit 101 falls within the first setting range 108, it is possible to easily detect whether the number of paper 6 between the transmission circuit substrate 51 and the ultrasonic receiver 27 is zero or two or more. The multi-feed detection device adjustment process of step S2 ends when the transmission and receiving element setting unit 94 sets the optimum ultrasonic receiving element 107 and the output voltage of the peak hold circuit 101 falls within the first setting range 108. In addition to step S2, the method by which the comparator circuit 102 detects the number of paper 6 using the intensity of the ultrasonic wave 56 received by the optimum ultrasonic receiving element 107 and the multi-feed determination voltage 112 is the multi-feed detection method.

As described above, according to the present embodiment, it has the following effects.

(1) According to the present embodiment, the multi-feed detection device 50 includes the transmission circuit substrate 51 on which the ultrasonic transmitter 31 is installed and the ultrasonic receiver 27. The ultrasonic receiver 27 receives the ultrasonic wave 56 transmitted from the ultrasonic transmitter 31. When the sheet-like paper 6 is present in the course of the ultrasonic wave 56, as the number of paper 6 increases, the intensity of the ultrasonic wave 56 passing through the paper 6 decreases, so that the multi-feed detection device 50 can detect the paper 6 is multi-fed.

The ultrasonic transmitter 31 transmits the ultrasonic wave 56 in a direction intersecting a thickness direction of the transmission circuit substrate 51. When advancing the paper 6 in the planar direction of the transmission circuit substrate 51, the reflected wave of the ultrasonic wave 56 reflected on the paper 6 advances in a direction different from the direction of the ultrasonic transmitter 31. Accordingly, it is possible to suppress the interference of the ultrasonic wave 56 transmitted from the ultrasonic transmitter 31 with the reflected wave.

The ultrasonic receiver 27 receives the ultrasonic wave 56 on the receiving surface 66a. Since the ultrasonic receiver 27 has the plurality of ultrasonic receiving elements 68, the ultrasonic receiver 27 can receive the ultrasonic wave 56 by switching the ultrasonic receiving element 68 which receives the ultrasonic wave 56. Accordingly, since the ultrasonic receiving element 68 can be selected such that the ultrasonic receiver 27 receives the ultrasonic wave 56 after assembling the transmission circuit substrate 51 and the ultrasonic receiver 27, the positional accuracy in the relative position between the transmission circuit substrate 51 and the ultrasonic receiver 27 is not required. As a result, since the transmission circuit substrate 51 and the ultrasonic receiver 27 can be easily assembled, the multi-feed detection device 50 can be easily assembled.

(2) According to the present embodiment, one ultrasonic element group 58 including the ultrasonic transmission elements 57 driven by the same drive signal is installed in the ultrasonic transmitter 31, and the plurality of ultrasonic receiving elements 68 are disposed in the ultrasonic receiver 27. In the ultrasonic receiver 27, the plurality of ultrasonic receiving elements 68 receive the ultrasonic waves 56 transmitted from the ultrasonic transmitter 31. When the relative position between the ultrasonic transmitter 31 and the ultrasonic receiver 27 installed on the transmission circuit substrate changes, the optimum ultrasonic receiving element 107 which receives the ultrasonic wave 56 with the strongest intensity changes.

Then, the transmission and receiving element setting unit 94 specifies and sets the optimum ultrasonic receiving element 107, and outputs an electrical signal corresponding to the intensity of the ultrasonic wave 56 from the optimum ultrasonic receiving element 107. Therefore, even when the relative position between the ultrasonic transmitter 31 and the ultrasonic receiver 27 varies when the ultrasonic transmitter 31 and the ultrasonic receiver 27 are assembled, it is possible to output an electrical signal corresponding to the ultrasonic wave 56 from the optimum ultrasonic receiving element 107 which receives the ultrasonic wave 56 with the strongest intensity. As a result, it is possible to assemble the transmission circuit substrate 51 and the ultrasonic receiver 27 without requiring the positional accuracy of the relative position.

(3) According to the multi-feed detection method in the present embodiment, the transmission circuit substrate 51 provided with the ultrasonic transmitter 31 is installed in the multi-feed detection device 50. The ultrasonic receiver 27 receives the ultrasonic wave 56 transmitted from the ultrasonic transmitter 31. The ultrasonic receiver 27 has the plurality of ultrasonic receiving elements 68.

By causing the plurality of ultrasonic receiving elements 68 to receive the ultrasonic waves 56, the transmission and receiving element setting unit 94 specifies the optimum ultrasonic receiving element 107 which is the ultrasonic receiving element 68 which received the ultrasonic wave 56 with the strongest intensity. When the relative position between the ultrasonic transmitter 31 and the ultrasonic receiver 27 changes, the optimum ultrasonic receiving element 107 which receives the ultrasonic wave 56 with the strongest intensity changes. The optimum ultrasonic receiving element 107 is the ultrasonic receiving element 68 positioned at an optimum position for the ultrasonic wave 56 to receive the ultrasonic wave 56 transmitted by the ultrasonic transmitter 31. The transmission and receiving element setting unit 94 specifies and sets the optimum ultrasonic receiving element 107 in the relative position between the installed ultrasonic transmitter 31 and the ultrasonic receiver 27.

Next, the ultrasonic transmitter 31 transmits the ultrasonic wave 56 to the sheet-like paper 6 passing between the ultrasonic transmitter 31 and the ultrasonic receiver 27. Next, the optimum ultrasonic receiving element 107 receives the ultrasonic wave 56 passed through the paper 6. As the number of paper 6 passing between the ultrasonic transmitter 31 and the ultrasonic receiver 27 increases, the intensity of the ultrasonic wave 56 received by the optimum ultrasonic receiving element 107 decreases. Then, the number of paper 6 is detected from the intensity of the ultrasonic wave 56 received by the optimum ultrasonic receiving element 107.

Therefore, even when the relative position between the ultrasonic transmitter 31 and the ultrasonic receiver varies when the ultrasonic transmitter 31 and the ultrasonic receiver 27 are assembled, it is possible to output an electrical signal corresponding to the ultrasonic wave 56 from the optimum ultrasonic receiving element 107 which receives the ultrasonic wave 56 with the strongest intensity. As a result, it is possible to assemble the transmission circuit substrate 51 and the ultrasonic receiver 27 without requiring the positional accuracy of the relative position.

Second Embodiment

Next, an embodiment of a multi-feed detection device installed in a scanner will be described with reference to FIGS. 17 to 21. The present embodiment is different from the first embodiment in that, the number of ultrasonic transmission elements 57 is increased and one ultrasonic receiving element 68 is used. The description on the same point as in the first embodiment will be omitted.

Figure 17:
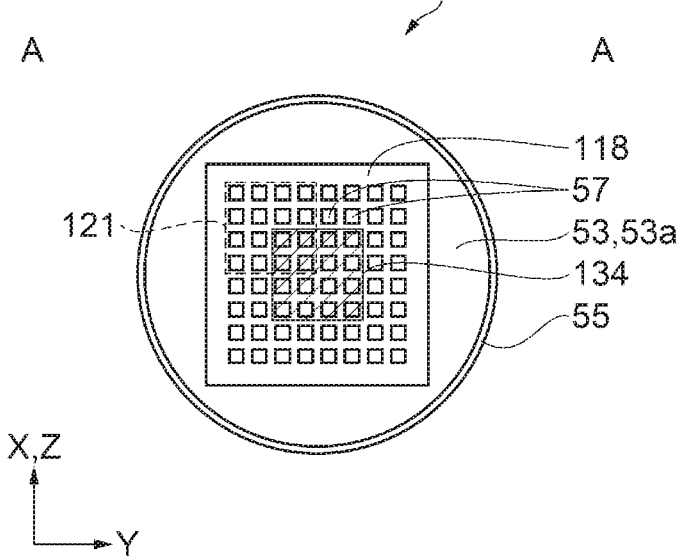
FIG. 17 is a schematic diagram for explaining a configuration of an ultrasonic transmission element in an ultrasonic transmitter according to a second embodiment.

FIG. 17 is a schematic diagram for explaining a configuration of the ultrasonic transmission element in the ultrasonic transmitter, and is a diagram as seen from the side of the surface along line A-A of FIG. 4. That is, in the present embodiment, as shown in FIG. 17, a multi-feed detection device 116 of a scanner 115 includes an ultrasonic transmitter 117. The ultrasonic transmitter 117 is installed on the transmission circuit substrate 51. A transmission element substrate 118 is installed on the first surface 53a of the transmission pedestal 53 in the ultrasonic transmitter 117.

The ultrasonic transmission elements 57 are arranged in a matrix on the transmission element substrate 118. In the present embodiment, the ultrasonic transmission elements 57 of eight rows and eight columns are assumed to be disposed on the transmission element substrate 118 in order to facilitate understanding of FIG. 17 and description. The number of ultrasonic transmission elements 57 installed on the transmission element substrate 118 is not particularly limited. For example, 225 ultrasonic transmission elements 57 of 15 rows and 15 columns may be disposed on the transmission element substrate 118. In this way, the ultrasonic transmitter 117 has the plurality of ultrasonic transmission elements 57. In other words, the transmission circuit substrate 51 of the multi-feed detection device 116 is provided with the ultrasonic transmitter 117 including the plurality of ultrasonic transmission elements 57 which transmit the ultrasonic waves 56.

One of the adjacently arranged ultrasonic transmission elements 57 of four rows and four columns in the ultrasonic transmission elements 57 of eight rows and eight columns is referred to as an ultrasonic element group 121. The number of ultrasonic transmission elements 57 constituting the ultrasonic element group 121 may be two or more, and the number of rows and the number of columns of the ultrasonic element group 121 are not particularly limited. For example, the configuration of the ultrasonic element group 121 may be two rows and one column, two rows and two columns, or three rows and three columns. When the row on the lower side of the ultrasonic element group 121 in FIG. 17 belongs to the lowest row in FIG. 17 on the transmission element substrate 118, the row number of the ultrasonic element group 121 is set as the first row. Then, the number of rows counted from the lower side of the transmission element substrate 118 in FIG. 17 up to the lower side of the ultrasonic element group 121 in FIG. 17 is taken as the row number of the ultrasonic element group 121. Accordingly, the row number of the ultrasonic element group 121 is any one of the first row to the fifth row. The row number of the position of the ultrasonic element group 121 in FIG. 17 is the fifth row.

When the column on the left side of the ultrasonic element group 121 in FIG. 17 belongs to the leftmost column in FIG. 17 on the transmission element substrate 118, the column number of the ultrasonic element group 121 is set as the first column. Then, the number of columns counted from the left side of the transmission element substrate 118 in FIG. 17 up to the left side of the ultrasonic element group 121 in FIG. 17 is taken as the column number of the ultrasonic element group 121. Accordingly, the column number of the ultrasonic element group 121 is any one of the first column to the fifth column. The column number of the position of the ultrasonic element group 121 in FIG. 17 is the first column.

The ultrasonic transmitter 117 simultaneously transmits the ultrasonic waves 56 received from the 16 ultrasonic transmission elements 57 of the ultrasonic element group 121. The position of the ultrasonic element group 121 has five options in the column direction and five options in the row direction. Accordingly, the position of the ultrasonic element group 121 has 25 options obtained by multiplying five and five. By changing the ultrasonic transmission element 57 constituting the ultrasonic element group 121, the position of the ultrasonic element group 121 can be changed. Then, by changing the position of the ultrasonic element group 121, the position where the ultrasonic element group 121 irradiates with the ultrasonic wave 56 can be changed.

Figure 18:
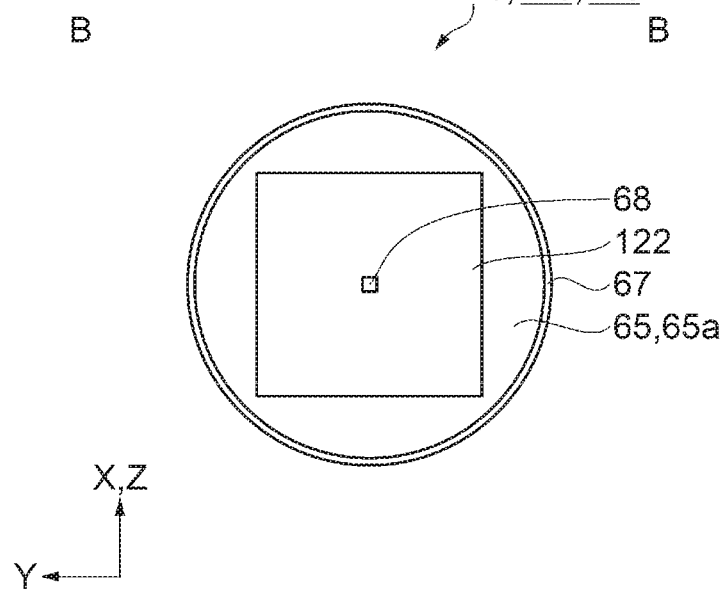
FIG. 18 is a schematic diagram for explaining a configuration of an ultrasonic receiving element in an ultrasonic receiver.

FIG. 18 is a schematic diagram for explaining a configuration of the ultrasonic receiving element in the ultrasonic receiver, and is a diagram as seen from the side of the surface along line B-B of FIG. 4. As shown in FIG. 18, the multi-feed detection device 116 includes an ultrasonic receiver 120. A receiving element substrate 122 is installed on the first surface 65a of the receiving pedestal 65 in the ultrasonic receiver 120. Then, the ultrasonic receiver 120 receives the ultrasonic wave 56 transmitted from the ultrasonic transmitter 117.

One ultrasonic receiving element 68 is installed on the receiving element substrate 122. Accordingly, the ultrasonic receiver 120 includes one ultrasonic receiving element 68. Then, one ultrasonic receiving element 68 receives the ultrasonic wave 56 transmitted from the ultrasonic transmitter 117.

Figure 19:
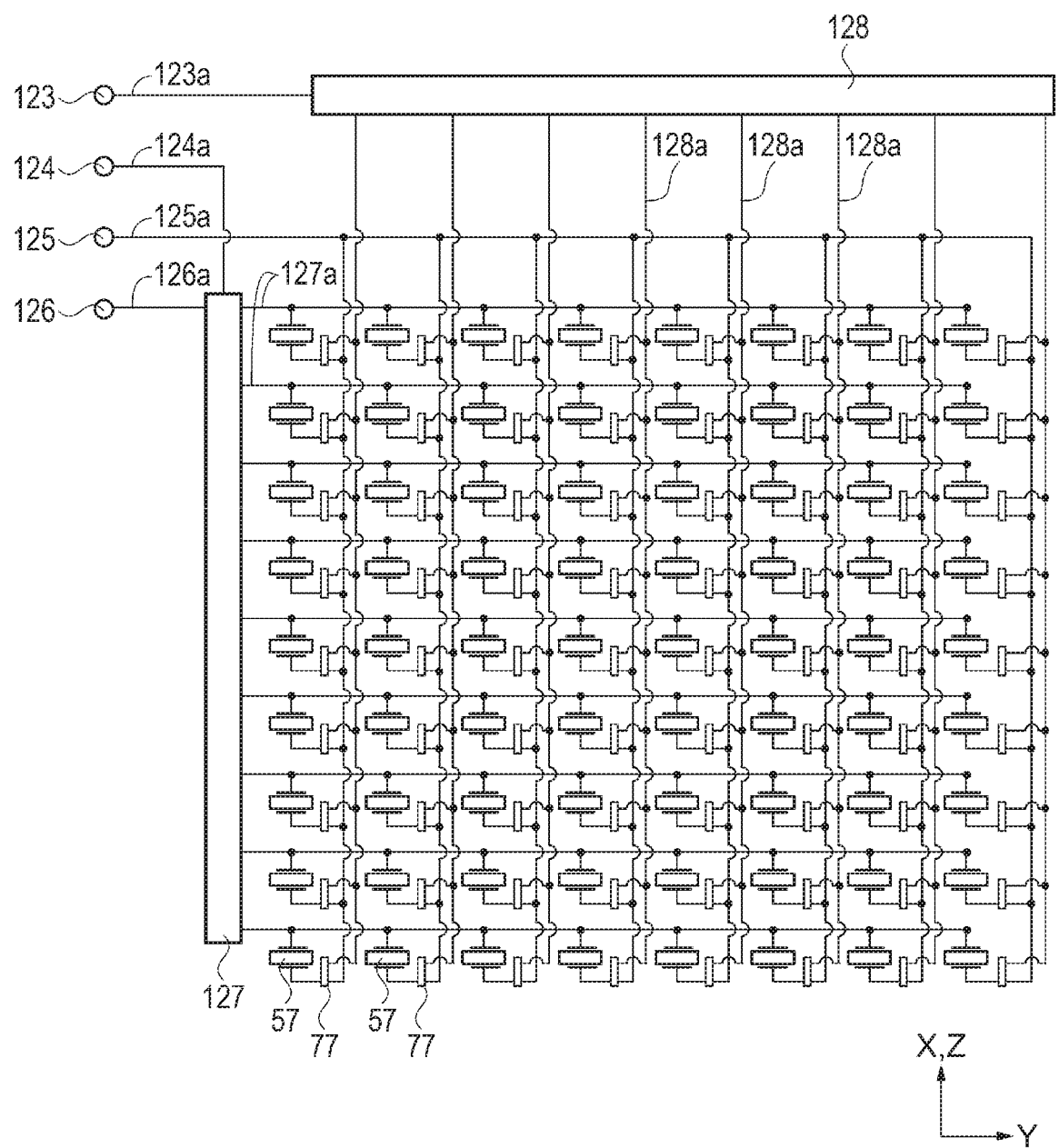
FIG. 19 is an electric circuit diagram of the ultrasonic transmitter.

FIG. 19 is an electric circuit diagram of the ultrasonic transmitter. As shown in FIG. 19, the ultrasonic transmitter 117 includes a first terminal 123, a second terminal 124, a third terminal 125, and a fourth terminal 126. The first terminal 123 to the fourth terminal 126 are electrically connected to the transmission drive circuit 52 via the drive wiring 59 and the wiring 51a. The ultrasonic transmitter 117 also includes a row wiring switching unit 127 and a column wiring switching unit 128. The first terminal 123 is electrically connected to the column wiring switching unit 128 by a first wiring 123a. The second terminal 124 is electrically connected to the row wiring switching unit 127 by a second wiring 124a. The fourth terminal 126 is electrically connected to the row wiring switching unit 127 by a fourth wiring 126a.

The ultrasonic transmitter 117 includes a plurality of ultrasonic transmission elements 57 and switching elements 77, and the ultrasonic transmission elements 57 and the switching elements 77 are arranged in a matrix. The switching elements 77 are switching elements including transistors. The ultrasonic transmission elements 57 have two electrodes. One of each electrode is electrically connected to a row signal wiring 127a. Each ultrasonic transmission element 57 is electrically connected to the row wiring switching unit 127 via the row signal wiring 127a.

The other of each electrode in the ultrasonic transmission elements 57 is connected to one switching element 77, respectively. Each switching element 77 is electrically connected to the third terminal 125 by a column signal wiring 125a. Furthermore, each switching element 77 is electrically connected to the column wiring switching unit 128 by a column control wiring 128a.

The row wiring switching unit 127 receives a row control signal from the second terminal 124. The row wiring switching unit 127 electrically connects the fourth terminal 126 to four adjacent row signal wirings 127a of each row according to the row control signal. That is, the row wiring switching unit 127 selects the row of the four ultrasonic transmission elements 57 to be driven.

The column wiring switching unit 128 receives a column control signal from the first terminal 123. The column wiring switching unit 128 short-circuits the switching elements 77 according to the column control signal. Accordingly, the column wiring switching unit 128 electrically connects the third terminal 125 with four adjacent columns of ultrasonic transmission elements 57 among the column signal wirings 125a of each column. That is, the column wiring switching unit 128 selects the column of the ultrasonic transmission elements 57 to be driven.

The ultrasonic transmitter 117 receives the row control signal and the column control signal and electrically connects the ultrasonic transmission elements 57 of four rows and four columns at the position designated by the row control signal and the column control signal to the third terminal 125 and the fourth terminal 126. Then, the transmission drive circuit 52 outputs the burst signal for driving the ultrasonic transmission element 57 to the third terminal 125 and the fourth terminal 126. Here, the ultrasonic element group 121 including the ultrasonic transmission elements 57 of four rows and four columns, 16 ultrasonic transmission elements 57 are driven by the same drive signal. In the ultrasonic element group 121, 16 ultrasonic transmission elements 57 transmit the ultrasonic waves 56 with the same phase. As a result, the ultrasonic wave 56 advances from the ultrasonic element group 121 in the advancing direction 56a of the ultrasonic wave.

Figure 20:
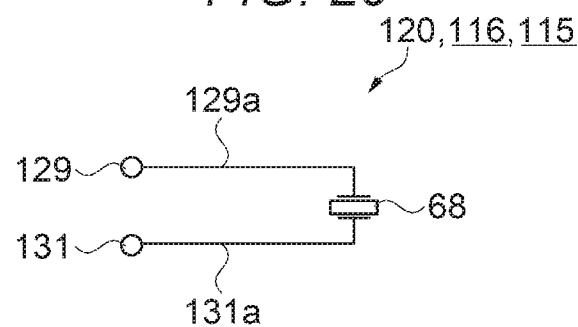
FIG. 20 is an electric circuit diagram of the ultrasonic receiver.

FIG. 20 is an electric circuit diagram of the ultrasonic receiver. As shown in FIG. 20, the ultrasonic receiver 120 includes a first terminal 129 and a second terminal 131. The first terminal 129 and the second terminal 131 are electrically connected to the receiving drive circuit 64 via the receiving element wiring 69 and the wiring 63a. The first terminal 129 is electrically connected to the ultrasonic receiving element 68 by a first wiring 129a. The second terminal 131 is electrically connected to the ultrasonic receiving element 68 by a second wiring 131a. When the ultrasonic receiving element 68 receives the ultrasonic wave 56, the ultrasonic receiving element 68 outputs the voltage waveform of the ultrasonic signal to the receiving drive circuit 64 via the first terminal 129 and the second terminal 131.

Next, the multi-feed detection device adjustment process of step S2 which is a part of the multi-feed detection method will be described. In step S2, the ultrasonic wave 56 is transmitted from the ultrasonic transmitter 117 toward the ultrasonic receiver 120. The intensity distribution of the ultrasonic wave 56 shows directivity in the advancing direction 56a of the ultrasonic wave.

The transmission and receiving element setting unit 94 sequentially switches the row number and the column number, and designates the ultrasonic element group 121 for outputting the ultrasonic wave 56 to the row wiring switching unit 127 and the column wiring switching unit 128. Specifically, the transmission and receiving element setting unit 94 designates the first to fifth columns of the first row. Thereafter, the transmission and receiving element setting unit 94 sequentially designates the first to fifth columns of the second to fifth rows. The transmission and receiving element setting unit 94 causes all the ultrasonic element groups 121 to transmit the ultrasonic wave 56. Then, the data indicating the intensity of the ultrasonic wave 56 received by the ultrasonic receiving element 68 is output from the ultrasonic receiving element 68 to the control unit 13 and stored in the memory 15 as the receiving element data 88.

Figure 21:
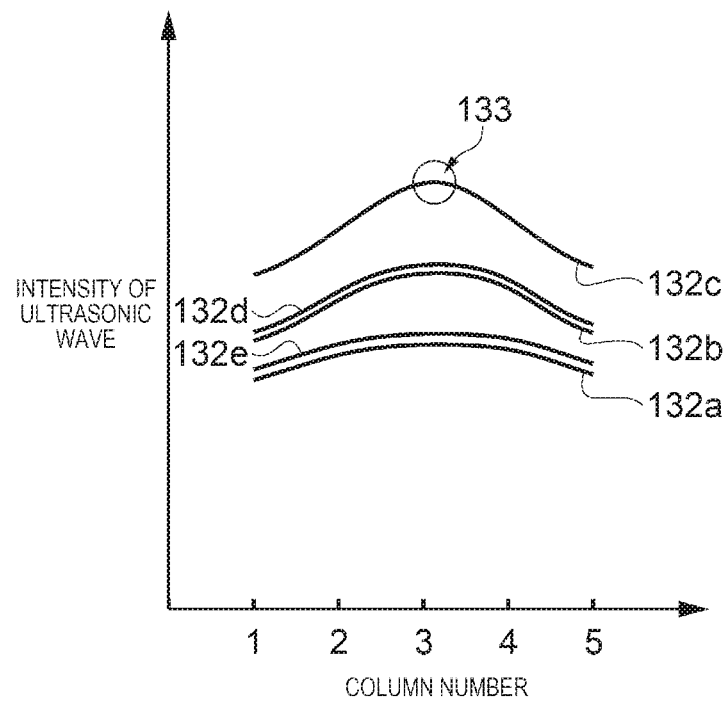
FIG. 21 is a graph for explaining a method of selecting an optimum ultrasonic transmission element.

FIG. 21 is a graph for explaining a method of selecting an optimum ultrasonic transmission element. The vertical axis in FIG. 21 indicates the intensity of the ultrasonic wave 56 received by the ultrasonic receiving element 68. The horizontal axis indicates the column number of the ultrasonic element group 121 of the ultrasonic transmitter 117. A first row distribution 132a to a fifth row distribution 132e show an example of the receiving element data 88.

The first row distribution 132a is the intensity distribution of the ultrasonic wave 56 received by the ultrasonic receiving element 68 when the ultrasonic element group 121 of the first row transmits the ultrasonic wave 56. Similarly, the second row distribution 132b to the fifth row distribution 132e are the intensity distributions of the ultrasonic wave 56 received by the ultrasonic receiving element 68 when the ultrasonic element group 121 of the second row to the fifth row having the row number respectively transmits the ultrasonic wave 56.

Among the first row distribution 132a to the fifth row distribution 132e, the third row distribution 132c is the distribution of the ultrasonic wave 56 with the strongest intensity. In the third row distribution 132c, there is a peak 133 in the third column among the first to fifth columns. Accordingly, when the ultrasonic element group 121 in the third row and the third column transmits the ultrasonic wave 56, the ultrasonic receiving element 68 receives the ultrasonic wave 56 with the highest sensitivity. The transmission and receiving element setting unit 94 analyzes the first row distribution 132a to the fifth row distribution 132e and specifies the ultrasonic element group 121 when the ultrasonic receiving element 68 can receive the ultrasonic wave 56 with high sensitivity. The ultrasonic transmission element 57 constituting the ultrasonic element group 121 here is set as an optimum ultrasonic transmission element 134 shown in FIG. 17.

That is, the ultrasonic transmitter 117 sequentially transmits the ultrasonic wave 56 from the plurality of ultrasonic transmission elements 57 and the transmission and receiving element setting unit 94 specifies the optimum ultrasonic transmission element 134 which is the ultrasonic transmission element 57 that performs transmission when the ultrasonic receiver 120 receives the ultrasonic wave 56 with the strongest intensity. Then, the ultrasonic transmitter 117 transmits the ultrasonic wave 56 from the ultrasonic transmission element 57 from which the ultrasonic receiving element 68 receives the ultrasonic wave 56 with the strongest intensity, among the plurality of ultrasonic transmission elements 57. Here, the transmission and receiving element setting unit 94 of the control unit sets the ultrasonic transmission element 57 to be operated, among the plurality of ultrasonic transmission elements 57.

The ultrasonic wave 56 is transmitted from the optimum ultrasonic transmission element 134 to the sheet-like paper 6 passing between the ultrasonic transmitter 117 and the ultrasonic receiver 120. Then, the ultrasonic receiver 120 receives the ultrasonic wave 56 passed through the paper 6, and the comparator circuit 102 detects the number of paper 6 from the intensity of the ultrasonic wave 56 received by the ultrasonic receiver 120.

As described above, according to the present embodiment, it has the following effects.

(1) According to the present embodiment, one ultrasonic receiving element 68 is installed in the ultrasonic receiver 120, and the plurality of ultrasonic transmission elements 57 are disposed in the ultrasonic transmitter 117. In the ultrasonic receiver 120, one ultrasonic receiving element 68 receives the ultrasonic waves 56 transmitted from the plurality of ultrasonic transmission elements 57. When the relative position between the ultrasonic transmitter 117 and the ultrasonic receiver 120 changes, the ultrasonic transmission element 57 which transmits the ultrasonic wave 56 with the strongest intensity to be received by the ultrasonic receiver 120 changes. The transmission and receiving element setting unit 94 specifies and sets the optimum ultrasonic transmission element 134 at the relative position between the installed ultrasonic transmitter 117 and the ultrasonic receiver 120.

The ultrasonic transmitter 117 transmits the ultrasonic wave 56 from the ultrasonic transmission element 57 which transmits the ultrasonic wave 56 with the strongest intensity to be received by the ultrasonic receiver 120 among the plurality of ultrasonic transmission elements 57. Therefore, even when the relative position between the ultrasonic transmitter 117 and the ultrasonic receiver 120 varies when the ultrasonic transmitter 117 and the ultrasonic receiver 120 are assembled, it is possible to transmit the ultrasonic wave 56 from the optimum ultrasonic transmission element 134 which transmits the ultrasonic wave with the strongest intensity to be received by the ultrasonic receiver 120. As a result, it is possible to assemble the transmission circuit substrate 51 including the ultrasonic transmitter 117 and the ultrasonic receiver 120 without requiring the positional accuracy of the relative position.

(2) According to the multi-feed detection method in the present embodiment, the transmission circuit substrate 51 including the ultrasonic transmitter 117 is installed, and the ultrasonic transmitter 117 has the plurality of ultrasonic transmission elements 57. The ultrasonic receiver 120 receives the ultrasonic wave 56 transmitted from the ultrasonic transmission element 57.

The ultrasonic transmitter 117 sequentially transmits the ultrasonic wave 56 from the plurality of ultrasonic transmission elements 57 and the transmission and receiving element setting unit 94 specifies the optimum ultrasonic transmission element 134 which is the ultrasonic transmission element 57 that performs transmission when the ultrasonic receiver 120 receives the ultrasonic wave 56 with the strongest intensity. When the relative position between the ultrasonic transmitter 117 and the ultrasonic receiver 120 changes, the ultrasonic transmission element 57 which transmits the ultrasonic wave 56 with the strongest intensity to be received by the ultrasonic receiver 120 changes. The optimum ultrasonic transmission element 134 is the ultrasonic transmission element 57 positioned at the optimum position for the ultrasonic receiver 120 to receive the ultrasonic wave 56. The transmission and receiving element setting unit 94 specifies and sets the optimum ultrasonic transmission element 134 at the relative position between the installed ultrasonic transmitter 117 and the ultrasonic receiver 120.

Next, the ultrasonic wave 56 is transmitted from the optimum ultrasonic transmission element 134 to the sheet-like paper 6 passing between the ultrasonic transmitter 117 and the ultrasonic receiver 120. Next, the ultrasonic receiver 120 receives the ultrasonic wave 56 passed through the paper 6. As the number of paper 6 passing between the ultrasonic transmitter 117 and the ultrasonic receiver 120 increases, the intensity of the ultrasonic wave 56 received by the ultrasonic receiver 120 decreases. Then, whether the number of paper 6 is two or more is detected from the intensity of the ultrasonic wave 56 received by the ultrasonic receiver 120.

Therefore, even when the relative position between the ultrasonic transmitter 117 and the ultrasonic receiver 120 varies when the ultrasonic transmitter 117 and the ultrasonic receiver 120 are assembled, it is possible to transmit the ultrasonic wave 56 from the optimum ultrasonic transmission element 134 which transmits the ultrasonic wave with the strongest intensity to be received by the ultrasonic receiver 120. As a result, it is possible to assemble the transmission circuit substrate 51 including the ultrasonic transmitter 117 and the ultrasonic receiver 120 without requiring the positional accuracy of the relative position.

Third Embodiment

Next, an embodiment of a multi-feed detection device installed in a scanner will be described with reference to FIGS. 22 to 25. The present embodiment is different from the first embodiment in that, the number of ultrasonic transmission elements 57 is increased. In addition, the present embodiment is different from the second embodiment in that, the number of the ultrasonic receiving element 68 is increased. The description on the same point as in the first embodiment and the second embodiment will be omitted.

Figure 22:
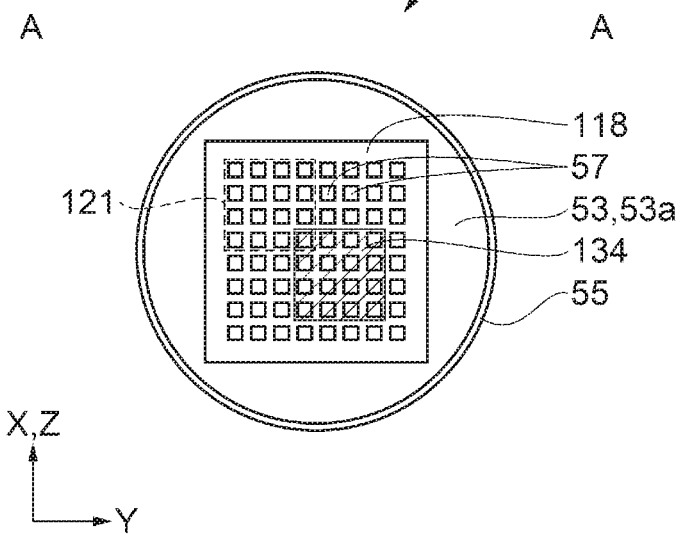
FIG. 22 is a schematic diagram for explaining a configuration of an ultrasonic transmission element in an ultrasonic transmitter according to a third embodiment.

FIG. 22 is a schematic diagram for explaining a configuration of the ultrasonic transmission element in the ultrasonic transmitter, and is a diagram as seen from the side of the surface along line A-A of FIG. 4. That is, in the present embodiment, as shown in FIG. 22, a multi-feed detection device 138 of a scanner 137 includes the ultrasonic transmitter 117. The ultrasonic transmitter 117 is installed on the transmission circuit substrate 51. A transmission element substrate 118 is installed on the first surface 53a of the transmission pedestal 53 in the ultrasonic transmitter 117.

The ultrasonic transmission elements 57 are arranged in a matrix on the transmission element substrate 118. In the present embodiment, the ultrasonic transmission elements 57 of eight rows and eight columns are assumed to be disposed on the transmission element substrate 118 in order to facilitate understanding of FIG. 22 and description. The number of ultrasonic transmission elements 57 installed on the transmission element substrate 118 is not particularly limited. For example, 225 ultrasonic transmission elements 57 of 15 rows and 15 columns may be disposed on the transmission element substrate 118. In this way, the ultrasonic transmitter 117 has the plurality of ultrasonic transmission elements 57. In other words, the ultrasonic transmitter 117 having the plurality of ultrasonic transmission elements 57 transmitting the ultrasonic wave 56 is installed on the transmission circuit substrate 51 of the multi-feed detection device 138.

One of the adjacently arranged ultrasonic transmission elements 57 of four rows and four columns in the ultrasonic transmission elements 57 of eight rows and eight columns is referred to as an ultrasonic element group 121. The number of the ultrasonic transmission elements 57 constituting the ultrasonic element group 121 may be two or more as in the ultrasonic element group 121 of the second embodiment, and the number of rows and columns of the ultrasonic element group 121 are not particularly limited. The numbering method of row numbers and the numbering method of column numbers of the ultrasonic element group 121 are the same as those of the second embodiment, and the description thereof is omitted.

The ultrasonic transmitter 117 simultaneously transmits the ultrasonic waves 56 received from the 16 ultrasonic transmission elements 57 of the ultrasonic element group 121. The position of the ultrasonic element group 121 has five options in the column direction and five options in the row direction. Accordingly, the position of the ultrasonic element group 121 has 25 options obtained by multiplying five and five. By changing the ultrasonic transmission element 57 constituting the ultrasonic element group 121, the position of the ultrasonic element group 121 can be changed. Then, by changing the position of the ultrasonic element group 121, the position to be irradiated with the ultrasonic wave 56 can be changed.

Figure 23:
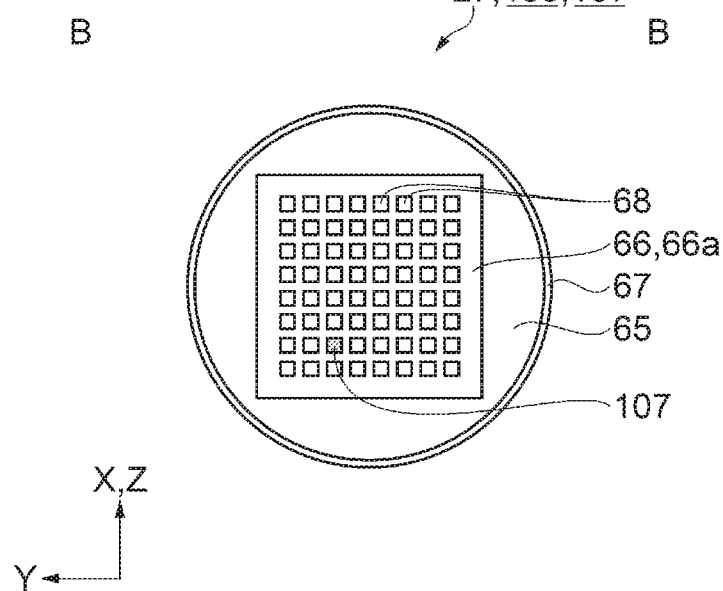
FIG. 23 is a schematic diagram for explaining a disposition of an ultrasonic receiving element in an ultrasonic receiver.

FIG. 23 is a schematic diagram for explaining a disposition of the ultrasonic receiving element in the ultrasonic receiver, and is a diagram as seen from the side of the surface along line B-B of FIG. 4. The multi-feed detection device 138 of the scanner 137 includes the ultrasonic receiver 27. The ultrasonic receiver 27 is installed on the receiving circuit substrate 63. The receiving element substrate 66 is installed on the first surface 65a of the receiving pedestal 65 in the ultrasonic receiver 27. As shown in FIG. 23, the ultrasonic receiver 27 includes the plurality of ultrasonic receiving elements 68 receiving the ultrasonic waves 56.

The ultrasonic receiving elements 68 are arranged in a matrix on the receiving element substrate 66. In the present embodiment, the ultrasonic receiving elements 68 of eight rows and eight columns are assumed to be disposed on the receiving element substrate 66 in order to facilitate understanding of FIG. 23 and description. The number of ultrasonic receiving elements 68 installed on the receiving element substrate 66 is not particularly limited. For example, 225 ultrasonic receiving elements 68 of 15 rows and 15 columns may be disposed on the receiving element substrate 66.

Next, the multi-feed detection device adjustment process of step S2 which is a part of the multi-feed detection method will be described. In step S2, the ultrasonic waves 56 are sequentially transmitted from the ultrasonic element group 121 of the ultrasonic transmitter 117. Then, the ultrasonic element group 121 that performs transmission when the ultrasonic receiver 27 receives the ultrasonic wave 56 with the strongest intensity and the ultrasonic receiving element 68 are specified.

The transmission and receiving element setting unit 94 sequentially switches the row number and the column number, and transmits the ultrasonic waves 56 to all of the ultrasonic element groups 121. Then, the data indicating the intensity of the ultrasonic wave 56 received by the ultrasonic receiving element 68 is output from the ultrasonic receiving element 68 to the control unit 13 and stored in the memory 15 as the receiving element data 88. The CPU 14 calculates the maximum intensity value among the intensities of the ultrasonic waves 56 received by each ultrasonic receiving element 68 in the irradiation of each ultrasonic element group 121 and stores it in the memory 15.

Figure 24:
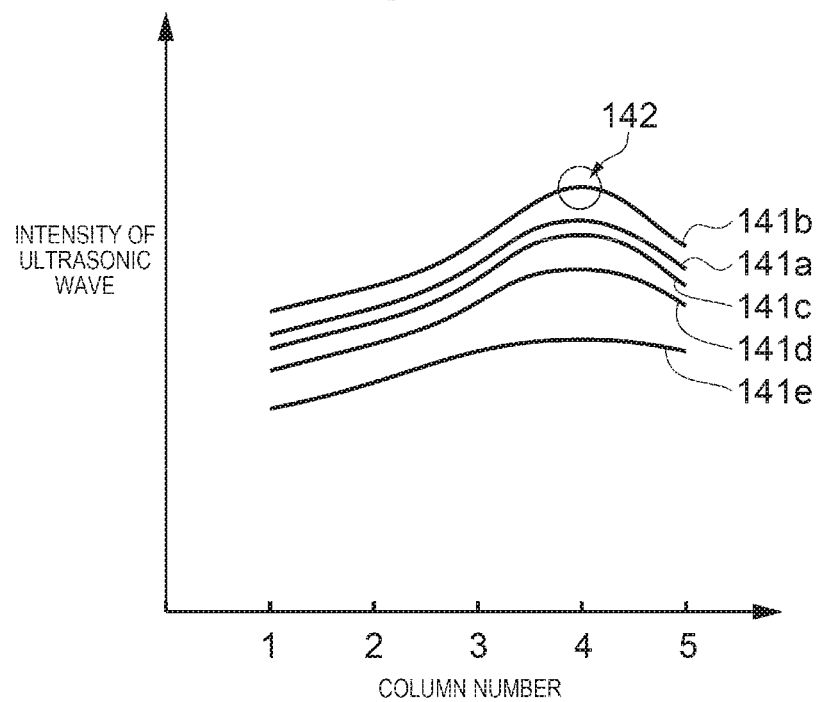
FIG. 24 is a graph for explaining a method of selecting the optimum ultrasonic transmission element.

FIG. 24 is a graph for explaining a method of setting the optimum ultrasonic transmission element. The vertical axis in FIG. 24 indicates the intensity of the ultrasonic waves 56 received by the ultrasonic receiving elements 68. The horizontal axis indicates the column number of the ultrasonic element group 121 of the ultrasonic transmitter 117.

The first row distribution 141a is the intensity distribution of the maximum intensity among the ultrasonic waves 56 received by the plurality of ultrasonic receiving elements 68 when the ultrasonic element group 121 of the first row transmitted the ultrasonic wave 56. Similarly, the second row distribution 141b to the fifth row distribution 141e are intensity distributions of maximum intensity among the ultrasonic waves 56 received by the plurality of ultrasonic receiving elements 68 when the ultrasonic element group 121 having the row numbers of the second row to the fifth row respectively transmits the ultrasonic wave 56.

Among the first row distribution 141a to the fifth row distribution 141e, the second row distribution 141b is the distribution of the ultrasonic wave 56 with the strongest intensity. In the second row distribution 141b, there is a peak 142 in the fourth column among the first to fifth columns. Accordingly, when the ultrasonic element group 121 in the second row and the fourth column transmits the ultrasonic wave 56, one of the plurality of ultrasonic receiving elements 68 receives the ultrasonic wave 56 with the highest sensitivity. The transmission and receiving element setting unit 94 analyzes the first row distribution 141a to the fifth row distribution 141e and specifies the ultrasonic element group 121 when any one of the ultrasonic receiving elements 68 can receive the ultrasonic wave 56 with high sensitivity. The ultrasonic transmission element 57 constituting the ultrasonic element group 121 here is set as an optimum ultrasonic transmission element 134 shown in FIG. 22.

As described above, the ultrasonic transmitter 117 sequentially transmits the ultrasonic wave 56 from the plurality of ultrasonic transmission elements 57 and the optimum ultrasonic transmission element 134 which is the ultrasonic transmission element 57 that performs transmission when the ultrasonic receiver 27 receives the ultrasonic wave 56 with the strongest intensity is specified. Next, the plurality of ultrasonic receiving elements 68 receive the ultrasonic wave 56 transmitted by the optimum ultrasonic transmission element 134. Then, the ultrasonic receiving element 68 which receives the ultrasonic wave 56 with the strongest intensity is specified.

Figure 25:
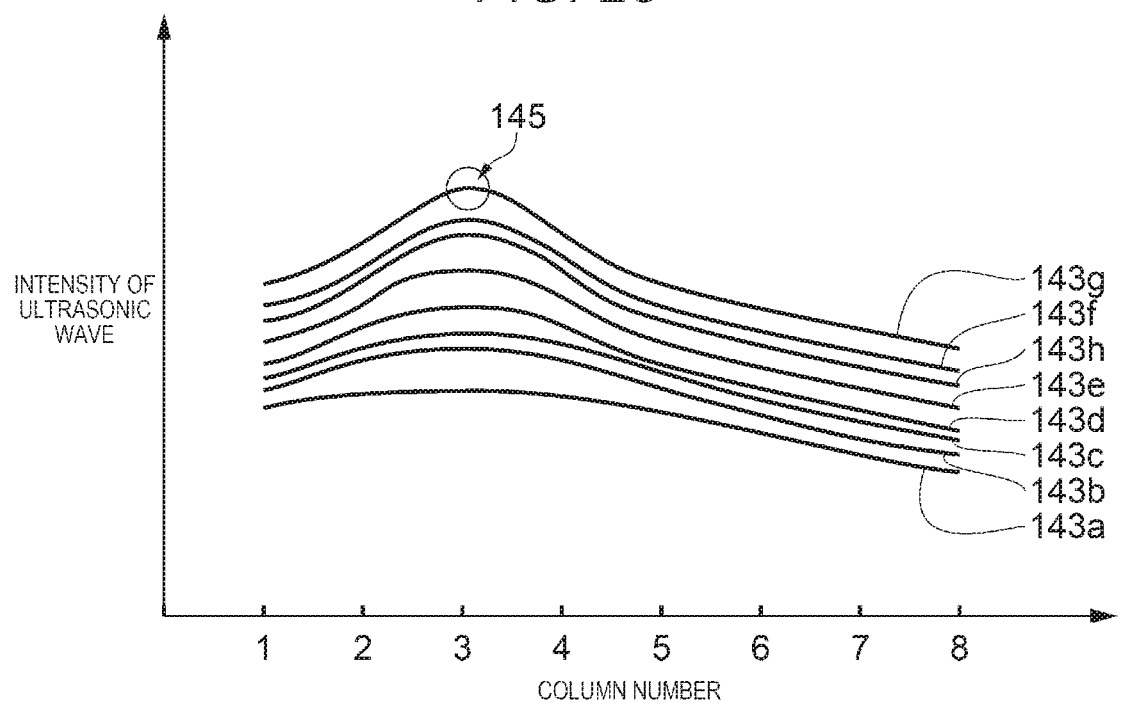
FIG. 25 is a graph for explaining a method of selecting an optimum ultrasonic receiving element.

FIG. 25 is a graph for explaining a method of selecting an optimum ultrasonic receiving element. FIG. 25 shows the intensity distributions of the ultrasonic waves 56 received by the ultrasonic receiving elements 68 arranged in the ultrasonic receiver 27 when the ultrasonic element group 121 of the optimum ultrasonic transmission element 134 transmits the ultrasonic wave 56. The vertical axis in FIG. 25 indicates the intensity of the ultrasonic waves 56 received by the ultrasonic receiving elements 68. The horizontal axis indicates the column numbers of ultrasonic receiving elements 68. In FIG. 23, the column numbers are set in order from the first column to the eighth column from +Y side to −Y side. The row numbers are set in order from the first row to the eighth row from +X side to −X side.

Returning to FIG. 25, the first row distribution 143a is the intensity distribution of the ultrasonic waves 56 received by the ultrasonic receiving elements 68 in the first row. Similarly, the second row distribution 143b to the eighth row distribution 143h are the intensity distributions of the ultrasonic waves 56 received by the ultrasonic receiving elements 68 in the second to eighth rows, respectively. Among the first row distribution 143*a* to the eighth row distribution 143*h*, the seventh row distribution 143*g* is the distribution of the ultrasonic wave with the strongest intensity. In the seventh row distribution 143*g*, there is a peak 145 in the third column among the first to eighth columns. In the ultrasonic receiver 27, the ultrasonic receiving element 68 in the seventh row and the third column is receiving the ultrasonic wave 56 with the highest sensitivity.

As described above, in the ultrasonic receiver 27, the plurality of ultrasonic receiving elements 68 receive the ultrasonic wave 56 transmitted by the optimum ultrasonic transmission element 134, and transmission and receiving element setting unit 94 specifies the optimum ultrasonic receiving element 107 which is the ultrasonic receiving element 68 which received the ultrasonic wave 56 with the strongest intensity.

As shown in FIG. 23, the transmission and receiving element setting unit 94 sets the ultrasonic receiving element 68 in the seventh row and the third column which can receive the ultrasonic wave 56 with high sensitivity as the optimum ultrasonic receiving element 107. Then, an electrical signal corresponding to the intensity of the ultrasonic wave 56 is output from the set ultrasonic receiving element 68 to the receiving drive circuit 64. As described above, the ultrasonic receiver 27 receives the ultrasonic wave 56 transmitted from the ultrasonic transmitter 117, and the ultrasonic receiver 27 outputs an electrical signal corresponding to the intensity of the ultrasonic wave 56 from the optimum ultrasonic receiving element 107 which is the ultrasonic receiving element 68 which receives the ultrasonic wave 56 with the strongest intensity, among the plurality of ultrasonic receiving elements 68.

That is, the ultrasonic transmitter 117 sequentially transmits the ultrasonic wave 56 from the plurality of ultrasonic transmission elements 57 and the optimum ultrasonic transmission element 134 which is the ultrasonic transmission element 57 that performs transmission when the ultrasonic receiver 27 receives the ultrasonic wave 56 with the strongest intensity is specified. Then, in the ultrasonic receiver 27, the plurality of ultrasonic receiving elements 68 receive the ultrasonic wave transmitted by the optimum ultrasonic transmission element 134, and the optimum ultrasonic receiving element 107 which is the ultrasonic receiving element 68 received the ultrasonic wave 56 with the strongest intensity is specified.

The ultrasonic transmitter 117 transmits the ultrasonic wave 56 from the ultrasonic transmission element from which the ultrasonic receiver 27 receives the ultrasonic wave 56 with the strongest intensity, among the plurality of ultrasonic transmission elements 57. Then, the ultrasonic receiver 27 outputs an electrical signal corresponding to the ultrasonic wave 56 from the ultrasonic receiving element 68 which receives the ultrasonic wave 56 with the strongest intensity, among the plurality of ultrasonic receiving elements 68 to the receiving drive circuit 64.

In this way, the transmission and receiving element setting unit 94 of the control unit 13 sets the ultrasonic transmission element 57 to be operated among the plurality of ultrasonic transmission elements 57. Furthermore, the transmission and receiving element setting unit 94 sets the ultrasonic receiving element 68 to be operated among the plurality of ultrasonic receiving elements 68.

The ultrasonic wave 56 is transmitted from the optimum ultrasonic transmission element 134 to the paper 6 passing between the ultrasonic transmitter 117 and the ultrasonic receiver 27. The optimum ultrasonic receiving element 107 receives the ultrasonic wave 56 passed through the paper 6.

Then, the comparator circuit 102 detects the number of paper 6 from the intensity of the ultrasonic wave 56 received by the ultrasonic receiver 27.

As described above, according to the present embodiment, it has the following effects.

(1) According to the present embodiment, the ultrasonic transmitter 117 includes the plurality of ultrasonic transmission elements 57 and the ultrasonic receiver 27 includes the plurality of ultrasonic receiving elements 68. The plurality of ultrasonic receiving elements receive the ultrasonic wave 56 transmitted from the plurality of ultrasonic transmission elements 57. When the relative position between the ultrasonic transmitter 117 and the ultrasonic receiver 27 changes, the combination of the optimum ultrasonic receiving element 107 which receives the ultrasonic wave 56 with the strongest intensity and the optimum ultrasonic transmission element 134 which transmits the ultrasonic wave 56 with the strongest intensity changes.

That is, when the relative position between the ultrasonic transmitter 117 and the ultrasonic receiver 27 changes, the optimum combination of the ultrasonic transmission element 57 and the ultrasonic receiving element 68 changes. The ultrasonic transmitter 117 transmits the ultrasonic wave 56 from the ultrasonic transmission element 57 which transmits the ultrasonic wave 56 with the strongest intensity to be received by the ultrasonic receiver 27 among the plurality of ultrasonic transmission elements 57. The ultrasonic receiver 27 outputs an electrical signal from the ultrasonic transmission element 68 which receives the ultrasonic wave 56 with the strongest intensity, among the plurality of ultrasonic receiving elements 68.

Therefore, even when the relative position between the ultrasonic transmitter 117 and the ultrasonic receiver varies when the ultrasonic transmitter 117 and the ultrasonic receiver 27 are assembled, it is possible to transmit the ultrasonic wave from the optimum ultrasonic transmission element 134 which transmits the ultrasonic wave with the strongest intensity to be received by the optimum ultrasonic receiving element 107. As a result, it is possible to assemble the transmission circuit substrate 51 on which the ultrasonic transmitter 117 is installed and the ultrasonic receiver 27 without requiring the positional accuracy of the relative position.

(2) According to the present embodiment, the transmission circuit substrate 51 including the ultrasonic transmitter 117 is installed, and the ultrasonic transmitter 117 has the plurality of ultrasonic transmission elements 57. The ultrasonic receiver 27 includes the plurality of ultrasonic receiving elements 68.

The ultrasonic transmitter 117 sequentially transmits the ultrasonic wave 56 from the plurality of ultrasonic element groups 121 and the optimum ultrasonic transmission element 134 which is the ultrasonic transmission element 57 of ultrasonic element group 121 that performs transmission when the ultrasonic receiver 27 receives the ultrasonic wave 56 with the strongest intensity is specified. That is, in the ultrasonic receiver 27, the plurality of ultrasonic receiving elements 68 receive the ultrasonic wave transmitted by the optimum ultrasonic transmission element 134 and the transmission and receiving element setting unit 94 specifies the optimum ultrasonic receiving element 107 which is the ultrasonic receiving element 68 which received the ultrasonic wave 56 with the strongest intensity.

When the relative position between the ultrasonic transmitter 117 and the ultrasonic receiver 27 changes, the combination of the optimum ultrasonic receiving element 107 which receives ultrasonic wave 56 with the strongest intensity and the optimum ultrasonic transmission element 134 which transmits the ultrasonic wave 56 of this time changes. The combination of the optimum ultrasonic transmission element 134 and the optimum ultrasonic receiving element 107 is the combination of the ultrasonic transmission element 57 and the ultrasonic receiving element 68 positioned at the optimum position for transmitting and receiving the ultrasonic wave 56.

Next, ultrasonic wave 56 is transmitted from the optimum ultrasonic transmission element 134 to the paper 6 passing between the ultrasonic transmitter 117 and the ultrasonic receiver 27. Next, the optimum ultrasonic receiving element 107 receives the ultrasonic wave 56 passed through the paper 6. As the number of paper 6 passing between the ultrasonic transmitter 117 and the ultrasonic receiver 27 increases, the intensity of the ultrasonic wave 56 received by the optimum ultrasonic receiving element 107 decreases. Then, the comparator circuit 102 detects the number of paper 6 from the intensity of the ultrasonic wave 56 received by the ultrasonic receiver 27.

Therefore, even when the relative position between the ultrasonic transmitter 117 and the ultrasonic receiver 27 varies when assembling the ultrasonic transmitter 117 and the ultrasonic receiver 27, it is possible to transmit the ultrasonic wave 56 from the optimum ultrasonic transmission element 134 which transmits the ultrasonic wave with the strongest intensity to be received by the optimum ultrasonic receiving element 107. As a result, it is possible to assemble the transmission circuit substrate including the ultrasonic transmitter 117 and the ultrasonic receiver 27 without requiring the positional accuracy of the relative position.

Fourth Embodiment

Next, an embodiment of a printing device including any one of the multi-feed detection device 50, the multi-feed detection device 116, and the multi-feed detection device 138 will be described using a schematic side diagram showing the structure of the printing device of FIG. 26. The description on the same point as in the first embodiment will be omitted.

Figure 26:
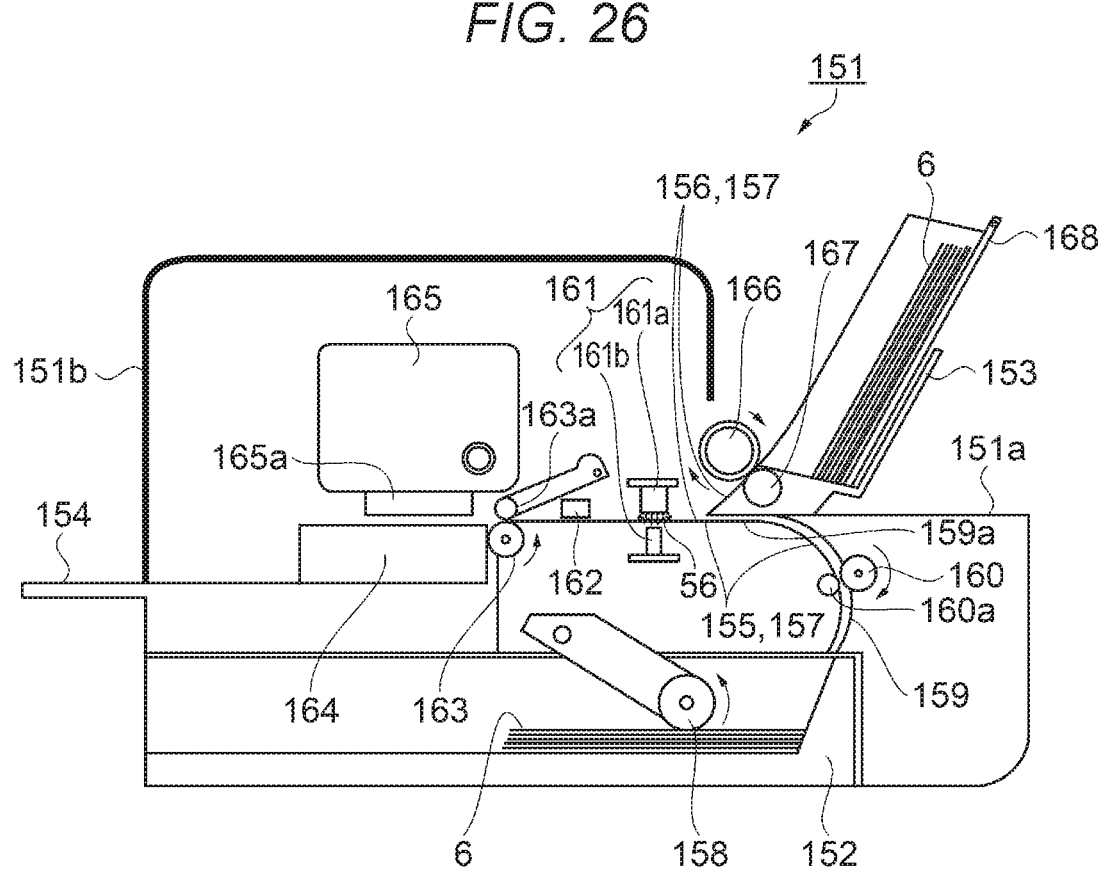
FIG. 26 is a schematic side diagram showing a structure of a printing device according to a fourth embodiment.

That is, in the present embodiment, as shown in FIG. 26, a printer 151 as an electronic device has a front paper feed tray 152 and a rear paper feed tray 153. The front paper feed tray 152 is installed substantially horizontally on a bottom portion of the printer 151. The rear paper feed tray 153 is disposed on a rear surface 151*a* of the printer 151 so as to protrude to the upper right in FIG. 26. Various types of paper 6 can be placed on the front paper feed tray 152 and the rear paper feed tray 153.

The paper 6 placed on the front paper feed tray 152 and the rear paper feed tray 153 is supplied through a predetermined transport path. The paper 6 is transported along the transport path and is discharged to a paper discharge tray 154 disposed on a front surface 151*b* side of the printer 151. That is, in the printer 151, there are a first transport path 155 of the paper 6 with the front paper feed tray 152 at an upstream position of the transport path, and a second transport path 156 of the paper 6 with the rear paper feed tray 153 at the upstream position of the transport path. A transport path 157 is configured of the first transport path 155 and the second transport path 156.

First, transport of the paper 6 from the first transport path 155 will be described. A pickup roller 158 is provided so that the outer circumference of the pickup roller 158 comes into contact with the paper 6 with respect to the uppermost paper 6 in FIG. 26 among the paper 6 placed on the front paper feed tray 152. The pickup roller 158 is joined with a transport motor, a gear, and the like (not shown). The pickup roller 158 is rotated about a rotation axis parallel to the paper 6 by the driving of the transport motor.

The pickup roller 158 rotates in the counterclockwise direction in FIG. 26 and sends out the paper 6 which comes into contact with the outer circumference of the pickup roller 158 to the rear surface 151*a* side. Then, an end of the paper 6 on the right side of FIG. 26 is guided to a transport guide 159. A portion of the transport guide 159 forms the transport path curved so as to draw a substantially semicircle. The paper 6 is guided to the transport guide 159 and advances to the paper discharge tray 154 side. The paper 6 is supplied to the upper side of FIG. 26 while being bent along the transport guide 159. An intermediate roller 160 is provided in the middle of the curved path of the transport guide 159. The outer circumference of the intermediate roller 160 is in contact with the paper 6 of the transport guide 159 from the right side in FIG. 26, and the intermediate roller 160 rotates about a rotation axis parallel to the paper 6. The intermediate roller 160 is joined with a transport motor, a gear, and the like (not shown), and is rotationally driven actively by the driving of the transport motor. The intermediate roller 160 rotates in a clockwise direction of FIG. 26. An intermediate driven roller 160*a* is provided so as to face the intermediate roller 160 with the paper 6 in between.

The paper 6 is further transported along the transport guide 159 as the intermediate roller 160 is rotationally driven. When a leading end of the paper 6 passes through the curved portion of the transport guide 159, the leading end of the paper 6 advances substantially parallel along a horizontal portion 159*a* of the transport guide 159 toward the front surface 151*b* of the printer 151. When the paper 6 advances substantially horizontally, the paper 6 reaches the multi-feed detection device 161. The multi-feed detection device 161 is installed in the first transport path 155 of the paper 6, and detects whether or not two or more sheets of paper 6 are overlapped. The multi-feed detection device 161 includes an ultrasonic transmitter 161*a* and an ultrasonic receiver 161*b*. One of the multi-feed detection device 50, the multi-feed detection device 116, and the multi-feed detection device 138 described above is used for the multi-feed detection device 161. The multi-feed detection device 50, the multi-feed detection device 116, and the multi-feed detection device 138 are devices that can be easily assembled. Accordingly, the printer 151 can be a device including the multi-feed detection device 161 with good assembly.

When the paper 6 advances to the front surface 151*b* side, the leading end of the paper 6 reaches a paper end sensor 162. The paper end sensor 162 has a light emitting unit and a light receiving unit (not shown). The leading end of the paper can be detected by determining whether or not the paper 6 is interrupting an optical path between the light emitting unit and the light receiving unit. The leading end of the paper is detected by the paper end sensor 162, the transport motor is subsequently driven, and the paper 6 is transported to the downstream of the transport path. A transport roller 163 is provided on the front surface 151*b* side of the paper end sensor 162, and the outer circumference of the transport roller 163 comes into contact with the paper 6 from the lower side. The transport roller 163 is joined with a transport motor, a gear, and the like (not shown), and is rotationally driven by the driving of the transport motor. In FIG. 26, the transport roller 163 rotates in a counterclockwise direction. A transport driven roller 163*a* is provided so as to face the transport roller 163 with the paper 6 in between. When the leading end of the paper reaches the transport roller 163, the paper 6 is transported by the transport roller 163.

A platen 164 is provided on the front surface 151b side of the transport roller 163, and the platen 164 supports the transported paper 6 from the below in FIG. 26. A carriage 165 is provided above the platen 164 in FIG. 26 with the paper 6 interposed therebetween. The carriage 165 includes a print head 165a on the lower side in FIG. 26. A large number of nozzles are arrayed and installed on a surface on the lower side of the print head 165a in FIG. 26, and ink is ejected from each of the nozzles. The carriage 165 moves in a direction perpendicular to the paper surface of FIG. 26. The movement of the carriage 165 in this direction is referred to as main scanning. While the carriage 165 performs main scanning, the print head 165a ejects ink on the paper 6. The print head 165a can draw a raster line along a main scanning axis with respect to a region facing the nozzles. After performing the main scanning, by driving the transport motor and transporting the paper 6, the printing position on the paper 6 can be shifted. Transporting the paper 6 for drawing is referred to as sub-scanning. By performing sub-scanning on the paper 6, the raster line can be drawn at a position different on the paper 6. By sequentially repeating the main scanning and the sub-scanning, the printer 151 forms a print image on the paper 6. The paper 6 on which the print image is formed is discharged to the paper discharge tray 154. The path through which the paper 6 is transported from the front paper feed tray 152 to the paper discharge tray 154 is the first transport path 155.

Next, transport of the paper 6 through the second transport path 156 will be described. As a mechanism member for supplying the paper 6 placed on the rear paper feed tray 153 to the second transport path 156, the printer 151 has a load roller 166, a load driven roller 167, a hopper 168, and the like. The load roller 166 is disposed so as to be rotatable adjacent to a lower end edge of the rear paper feed tray 153. The load roller 166 is joined with an auto sheet feeder motor, a gear, and the like (not shown). The load roller 166 rotates in a clockwise direction in FIG. 26 by the driving of the auto sheet feeder motor. The load roller 166 and the load driven roller 167 contact each other at a position near the lower end edge of the rear paper feed tray 153.

The hopper 168 is disposed so that the lower side of the rear paper feed tray 153 swings in a direction approaching the load roller 166 and in a direction away from the load roller 166. The hopper 168 approaches the load roller 166 so that the leading end of the uppermost paper 6 on the rear paper feed tray 153 hits the load roller 166, and this paper 6 is interposed between the hopper 168 and the load roller 166. By rotating the load roller 166 in this situation, the paper 6 is sandwiched between the load roller 166 and the load driven roller 167 and transported to the front surface 151b side.

The paper 6 transported by the rotation of the load roller 166 passes through the multi-feed detection device 161. The multi-feed detection device 161 is installed in the second transport path 156 of the paper 6, and detects whether or not two or more sheets of paper 6 are overlapped. The multi-feed detection device 161 is any one of the multi-feed detection device 50, the multi-feed detection device 116, and the multi-feed detection device 138 described above.

Next, the leading end of the paper 6 reaches the paper end sensor 162. The leading end of the paper 6 further transported to the front surface 151b side by the rotation of the load roller 166 passes through the paper end sensor 162 and reaches the transport roller 163. The paper 6 is transported on the platen 164 by the transport roller 163. The print image is formed by repeating the main scanning of the carriage 165 and the sub-scanning of the paper 6. The path through which the paper 6 is transported from the rear paper feed tray 153 to the paper discharge tray 154 is the second transport path 156. A transport path 157 is configured of the first transport path 155 and the second transport path 156.

As described above, according to the present embodiment, it has the following effects.

(1) According to the present embodiment, the printer 151 includes the transport path 157. The multi-feed detection device 161 is installed in the transport path 157, and the multi-feed detection device 161 detects whether or not two or more sheets of paper 6 are overlapped. Then, one of the multi-feed detection device 50, the multi-feed detection device 116, and the multi-feed detection device 138 is used for the multi-feed detection device 161. The multi-feed detection device 50, the multi-feed detection device 116, and the multi-feed detection device 138 are devices that can be easily assembled. Accordingly, the printer 151 can be a device including the multi-feed detection device 161 with good assembly.

The present embodiment is not limited to the above-described embodiments, and various modifications and improvements can be made by those having ordinary knowledge in the art within the technical idea of the present disclosure. Modification examples will be described below.

Modification Example 1

In the first embodiment, the ultrasonic transmitter 31 is installed on the upper substrate 29, and the ultrasonic receiver 27 is installed on the lower substrate 12. The ultrasonic wave 56 is transmitted from the +Z direction side of the paper 6, and the ultrasonic wave 56 is received from the −Z direction side of the paper 6. The positions of the ultrasonic receiver 27 and the ultrasonic transmitter 31 may be exchanged. Also at this time, the multi-feed detection device 50 can detect multi-feed, and can be easily assembled.

Modification Example 2

In the first embodiment, whether the number of paper 6 passing through the multi-feed detection device 50 is zero, one, or two is detected. The multi-feed detection device 50 may detect a state where three or more sheets of paper 6 are overlapped. Detection suitable for the electronic device may be performed.

Modification Example 3

In the first embodiment, the comparator circuit 102 compares the output voltage of the peak hold circuit 101 with the multi-feed determination voltage 112. The CPU 14 of the control unit 13 may determine whether or not the sheets are in a multi-feed state using the output of the A/D converter circuit 103. The multi-feed determination voltage 112 can be easily switched when changing the material of the paper 6.

Modification Example 4

In the first embodiment, the ultrasonic transmission elements 57 of the ultrasonic transmitter 31 are arranged in a matrix. The ultrasonic transmission elements 57 may be arranged in a row. Also at this time, the ultrasonic transmitter 31 can transmit the ultrasonic wave 56 toward the ultrasonic receiver 27. In the ultrasonic receiver 27, the ultrasonic receiving elements are arranged in a matrix. The ultrasonic receiving elements 68 may be arranged in a row. Also at this time, the optimum ultrasonic receiving element 107 can be selected from the plurality of ultrasonic receiving elements 68.

Modification Example 5

In the second embodiment, the ultrasonic transmission elements 57 of the ultrasonic transmitter 117 are arranged in a matrix. The ultrasonic transmission elements 57 may be arranged in a row. Also at this time, the ultrasonic transmitter 117 can select the ultrasonic transmission element 57 constituting an ultrasonic element group and transmit the ultrasonic wave 56 toward the ultrasonic receiver 27. Then, the transmission and receiving element setting unit 94 specifies the optimum ultrasonic transmission element 134 which is the ultrasonic transmission element 57 that performs transmission when the ultrasonic receiver 120 receives the ultrasonic wave 56 with the strongest intensity. Accordingly, even when the ultrasonic transmission elements 57 are arranged in a row, the optimum ultrasonic transmission element 134 can be set.

Modification Example 6

In the third embodiment, the ultrasonic transmission elements 57 of the ultrasonic transmitter 117 are arranged in a matrix. In the ultrasonic receiver 27, the ultrasonic receiving elements 68 are arranged in a matrix. The ultrasonic transmission elements 57 may be arranged in a row. The ultrasonic receiving elements 68 may also be arranged in a row. Also at this time, the ultrasonic transmitter 117 can select the ultrasonic transmission element 57 constituting an ultrasonic element group and transmit the ultrasonic wave 56 toward the ultrasonic receiver 27. Then, the transmission and receiving element setting unit 94 specifies the optimum ultrasonic transmission element 134 which is the ultrasonic transmission element 57 that performs transmission when the ultrasonic receiver 27 receives the ultrasonic wave 56 with the strongest intensity. Accordingly, even when the ultrasonic transmission elements 57 are arranged in a row, the optimum ultrasonic transmission element 134 can be set. Then, the optimum ultrasonic receiving element 107 can be selected from the plurality of ultrasonic receiving elements 68.

Hereinafter, contents derived from the embodiment will be described.

A multi-feed detection device includes a substrate on which an ultrasonic transmitter transmitting an ultrasonic wave is installed, an ultrasonic receiver receiving the ultrasonic wave, and a control unit controlling the ultrasonic transmitter and the ultrasonic receiver, in which the ultrasonic transmitter transmits the ultrasonic wave in a direction intersecting a thickness direction of the substrate, and at least one of the ultrasonic transmitter and the ultrasonic receiver has a plurality of ultrasonic elements, and the control unit sets an ultrasonic element to be operated among the plurality of ultrasonic elements.

According to this configuration, the multi-feed detection device includes a substrate on which an ultrasonic transmitter is installed and an ultrasonic receiver. The ultrasonic receiver receives the ultrasonic wave transmitted from the ultrasonic transmitter. When there is a sheet-like detection target in the course of the ultrasonic wave, as the number of the detection targets increases, the intensity of the ultrasonic wave passing through the detection target decreases, so that the multi-feed detection device can detect multi-feed of the detection target.

The ultrasonic transmitter transmits the ultrasonic wave in a direction diagonally intersecting a thickness direction of the substrate. When advancing the detection target in a planar direction of the substrate, the reflected wave of the ultrasonic wave reflected on the detection target advances in a direction different from the direction in which the ultrasonic transmitter is positioned. Accordingly, it is possible to suppress the interference of the ultrasonic wave transmitted from the ultrasonic transmitter with the reflected wave.

The ultrasonic receiver receives the ultrasonic wave. At least one of the ultrasonic transmitter and the ultrasonic receiver has the plurality of ultrasonic elements. When the ultrasonic transmitter has the plurality of ultrasonic elements, the ultrasonic transmitter can set the ultrasonic element transmitting the ultrasonic wave and cause the ultrasonic receiver to receive the ultrasonic wave.

When the ultrasonic receiver has the plurality of ultrasonic elements, the ultrasonic receiver can set the ultrasonic element to receive the ultrasonic wave and receive the ultrasonic wave. Accordingly, since the ultrasonic element can be selected such that the ultrasonic receiver receives the ultrasonic wave after assembling the substrate and the ultrasonic receiver, the positional accuracy in the relative position between the substrate and the ultrasonic receiver is not required. As a result, since the substrate and the ultrasonic receiver can be easily adjusted, the multi-feed detection device can be easily assembled.

In the multi-feed detection device, the ultrasonic transmitter may include one ultrasonic element group including the ultrasonic element driven with the same drive signal, the ultrasonic receiver may include the plurality of ultrasonic elements, and the ultrasonic receiver may receive the ultrasonic wave transmitted by the ultrasonic transmitter and the ultrasonic receiver may output an electrical signal corresponding to an intensity of the ultrasonic wave from the ultrasonic element which receives the ultrasonic wave with a strongest intensity, among the plurality of ultrasonic elements.

According to this configuration, one ultrasonic element group including the ultrasonic element driven by the same drive signal is installed in the ultrasonic transmitter, and the plurality of ultrasonic elements are disposed in the ultrasonic receiver. The ultrasonic element of the ultrasonic receiver is referred to as an ultrasonic receiving element. In the ultrasonic receiver, the plurality of ultrasonic receiving elements receive the ultrasonic wave transmitted from the ultrasonic transmitter. When the relative position between the ultrasonic transmitter and the ultrasonic receiver installed in the multi-feed detection device changes, the optimum ultrasonic receiving element receiving the ultrasonic wave with the strongest intensity changes.

An electrical signal corresponding to the intensity of the ultrasonic wave is output from the optimum ultrasonic receiving element. Therefore, even when the relative position between the ultrasonic transmitter and the ultrasonic receiver varies when the ultrasonic transmitter and the ultrasonic receiver are assembled, it is possible to output an electrical signal corresponding to the ultrasonic wave from the optimum ultrasonic receiving element which receives the ultrasonic wave with the strongest intensity. As a result, the substrate and the ultrasonic receiver can be assembled without requiring the positional accuracy of the relative position.

In the multi-feed detection device, the ultrasonic transmitter may include the plurality of ultrasonic elements, and the ultrasonic receiver includes one ultrasonic element, the ultrasonic receiver may receive the ultrasonic wave transmitted by the ultrasonic transmitter, and the ultrasonic transmitter may transmit the ultrasonic wave from the ultrasonic element from which the ultrasonic receiver receives the ultrasonic wave with a strongest intensity, among the plurality of ultrasonic elements.

According to this configuration, one ultrasonic element is installed in the ultrasonic receiver, and a plurality of ultrasonic elements are disposed in the ultrasonic transmitter. The ultrasonic element of the ultrasonic transmitter is referred to as an ultrasonic transmission element. One ultrasonic element receives the ultrasonic waves transmitted from the plurality of ultrasonic transmission elements in the ultrasonic receiver. When the relative position between the ultrasonic transmitter and the ultrasonic receiver changes, the ultrasonic transmission element transmitting the ultrasonic wave with the strongest intensity to be received by the ultrasonic receiver changes.

The ultrasonic transmitter transmits the ultrasonic wave from the ultrasonic transmission element that transmits the ultrasonic wave with the strongest intensity to be received by the ultrasonic receiver, among the plurality of ultrasonic transmission elements. Therefore, even when the relative position between the ultrasonic transmitter and the ultrasonic receiver varies when the ultrasonic transmitter and the ultrasonic receiver are assembled, it is possible to transmit the ultrasonic wave from the optimum ultrasonic transmission element that transmits the ultrasonic wave with the strongest intensity to be received by the ultrasonic receiver. As a result, the substrate and the ultrasonic receiver can be assembled without requiring the positional accuracy of the relative position.

In the multi-feed detection device, the ultrasonic transmitter may include the plurality of ultrasonic elements, and the ultrasonic receiver may include the plurality of ultrasonic elements, the ultrasonic transmitter may transmit the ultrasonic wave from the ultrasonic element from which the ultrasonic receiver receives the ultrasonic wave with a strongest intensity, among the plurality of ultrasonic elements, and the ultrasonic receiver may output an electrical signal corresponding to the ultrasonic wave from the ultrasonic element which receives the ultrasonic wave with the strongest intensity, among the plurality of ultrasonic elements.

According to this configuration, the ultrasonic transmitter includes a plurality of ultrasonic elements, and the ultrasonic receiver includes a plurality of ultrasonic elements. The ultrasonic element of the ultrasonic transmitter is referred to as an ultrasonic transmission element. The ultrasonic element of the ultrasonic receiver is referred to as an ultrasonic receiving element. The plurality of ultrasonic receiving elements receive the ultrasonic waves transmitted from the plurality of ultrasonic transmission elements. When the relative position between the ultrasonic transmitter and the ultrasonic receiver changes, the combination of the optimum ultrasonic receiving element that receives the ultrasonic wave with the strongest intensity and the optimum ultrasonic transmission element that transmits the ultrasonic wave changes.

That is, when the relative position between the ultrasonic transmitter and the ultrasonic receiver changes, the optimum combination of the ultrasonic transmission element and the ultrasonic receiving element changes. The ultrasonic transmitter transmits the ultrasonic wave from the ultrasonic transmission element that transmits the ultrasonic wave with the strongest intensity to be received by the ultrasonic receiver among the plurality of ultrasonic transmission elements. The ultrasonic receiver outputs an electrical signal from the optimum ultrasonic receiving element that receives the strongest intensity, among the plurality of ultrasonic receiving elements. Therefore, even when the relative position between the ultrasonic transmitter and the ultrasonic receiver varies when the ultrasonic transmitter and the ultrasonic receiver are assembled, it is possible to transmit the ultrasonic wave from the optimum ultrasonic transmission element that transmits the ultrasonic wave with the strongest intensity to be received by the optimum ultrasonic receiving element. As a result, the substrate and the ultrasonic receiver can be assembled without requiring the positional accuracy of the relative position.

A multi-feed detection method of a multi-feed detection device including a substrate on which an ultrasonic transmitter transmitting an ultrasonic wave is installed, and an ultrasonic receiver having a plurality of ultrasonic elements which receive the ultrasonic wave includes transmitting the ultrasonic wave by the ultrasonic transmitter, receiving the ultrasonic wave by the plurality of ultrasonic elements in the ultrasonic receiver, and specifying an optimum ultrasonic receiving element which is the ultrasonic element which receives the ultrasonic wave with a strongest intensity in the ultrasonic receiver, transmitting the ultrasonic wave from the ultrasonic transmitter to a sheet-like detection target passing between the ultrasonic transmitter and the ultrasonic receiver, receiving the ultrasonic wave passed through the detection target by the optimum ultrasonic receiving element, and detecting the number of the detection targets from an intensity of the ultrasonic wave received by the optimum ultrasonic receiving element.

According to this configuration, a substrate provided with an ultrasonic transmitter is installed. The ultrasonic receiver receives the ultrasonic wave transmitted from the ultrasonic transmitter. The ultrasonic receiver has a plurality of ultrasonic elements. The ultrasonic element of the ultrasonic receiver is referred as an ultrasonic receiving element.

By causing the plurality of ultrasonic receiving elements to receive the ultrasonic waves, the optimum ultrasonic receiving element which is the ultrasonic element which received the ultrasonic wave with the strongest intensity is specified. When the relative position between the ultrasonic transmitter and the ultrasonic receiver changes, the optimum ultrasonic receiving element receiving the ultrasonic wave with the strongest intensity changes. The optimum ultrasonic receiving element is an ultrasonic receiving element positioned at the optimum position for receiving the ultrasonic wave transmitted by the ultrasonic transmitter.

Next, the ultrasonic transmitter transmits the ultrasonic wave to the sheet-like detection target passing between the ultrasonic transmitter and the ultrasonic receiver. Next, the optimum ultrasonic receiving element receives the ultrasonic wave passed through the detection target. As the number of detection targets passing between the ultrasonic transmitter and the ultrasonic receiver increases, the intensity of the ultrasonic wave received by the optimum ultrasonic receiving element decreases. Then, the number of detection target is detected from the intensity of the ultrasonic wave received by the optimum ultrasonic receiving element.

Therefore, even when the relative position between the ultrasonic transmitter and the ultrasonic receiver varies when the ultrasonic transmitter and the ultrasonic receiver are assembled, it is possible to output an electrical signal corresponding to the ultrasonic wave from the optimum ultrasonic receiving element which receives the ultrasonic wave with the strongest intensity. As a result, the substrate and the ultrasonic receiver can be assembled without requiring the positional accuracy of the relative position.

A multi-feed detection method of a multi-feed detection device including a substrate provided with an ultrasonic transmitter having a plurality of ultrasonic elements transmitting ultrasonic waves, and an ultrasonic receiver receiving the ultrasonic wave includes sequentially transmitting the ultrasonic waves from the plurality of ultrasonic elements in the ultrasonic transmitter, and specifying an optimum ultrasonic transmission element which is the ultrasonic element transmitted when the ultrasonic receiver receives the ultrasonic wave with a strongest intensity in the ultrasonic transmitter, transmitting the ultrasonic wave from the optimum ultrasonic transmission element to a sheet-like detection target passing between the ultrasonic transmitter and the ultrasonic receiver, receiving the ultrasonic wave passed through the detection target by the ultrasonic receiver, and detecting the number of the detection target from an intensity of the ultrasonic wave received by the ultrasonic receiver.

According to this configuration, a substrate provided with an ultrasonic transmitter is installed, the ultrasonic transmitter has a plurality of ultrasonic elements. The ultrasonic element of the ultrasonic transmitter is referred to as an ultrasonic transmission element. The ultrasonic receiver receives the ultrasonic wave transmitted by the ultrasonic transmission element.

The ultrasonic transmitter sequentially transmits the ultrasonic wave from the plurality of ultrasonic transmission elements and the optimum ultrasonic transmission element which is the ultrasonic element that performs transmission when the ultrasonic receiver receives the ultrasonic wave with the strongest intensity is specified. When the relative position between the ultrasonic transmitter and the ultrasonic receiver changes, the ultrasonic transmission element transmitting the ultrasonic wave with the strongest intensity to be received by the ultrasonic receiver changes. The optimum ultrasonic transmission element is an ultrasonic transmission element positioned at the optimum position for the ultrasonic receiver to receive the ultrasonic wave.

Next, the optimum ultrasonic transmission element transmits the ultrasonic wave to the sheet-like detection target passing between the ultrasonic transmitter and the ultrasonic receiver. Next, the ultrasonic receiver receives the ultrasonic wave passed through the detection target. As the number of detection targets passing between the ultrasonic transmitter and the ultrasonic receiver increases, the intensity of the ultrasonic wave received by the ultrasonic receiver decreases. Then, the number of detection target is detected from the intensity of the ultrasonic wave received by the ultrasonic receiver.

Therefore, even when the relative position between the ultrasonic transmitter and the ultrasonic receiver varies when the ultrasonic transmitter and the ultrasonic receiver are assembled, it is possible to transmit the ultrasonic wave from the optimum ultrasonic transmission element that transmits the ultrasonic wave with the strongest intensity to be received by the ultrasonic receiver. As a result, the substrate and the ultrasonic receiver can be assembled without requiring the positional accuracy of the relative position.

A multi-feed detection method of a multi-feed detection device including a substrate on which an ultrasonic transmitter having a plurality of ultrasonic elements transmitting ultrasonic waves is installed, and an ultrasonic receiver having the plurality of ultrasonic elements receiving the ultrasonic waves includes sequentially transmitting the ultrasonic waves from the plurality of ultrasonic elements in the ultrasonic transmitter, and specifying an optimum ultrasonic transmission element which is the ultrasonic element transmitted when the ultrasonic receiver receives the ultrasonic wave with a strongest intensity in the ultrasonic transmitter, receiving the ultrasonic wave transmitted by the optimum ultrasonic transmission element by the plurality of ultrasonic elements in the ultrasonic receiver, and specifying an optimum ultrasonic receiving element which is the ultrasonic element which receives the ultrasonic wave with the strongest intensity in the ultrasonic receiver, transmitting the ultrasonic wave from the optimum ultrasonic transmission element to a detection target passing between the ultrasonic transmitter and the ultrasonic receiver, receiving the ultrasonic wave passed through the detection target by the optimum ultrasonic receiving element, and detecting the number of the detection target from an intensity of the ultrasonic wave received by the ultrasonic receiver.

According to this configuration, a substrate provided with an ultrasonic transmitter is installed, the ultrasonic transmitter has a plurality of ultrasonic elements. The ultrasonic element of the ultrasonic transmitter is referred to as an ultrasonic transmission element. The ultrasonic receiver receives the ultrasonic wave transmitted from the ultrasonic transmission element. The ultrasonic receiver has a plurality of ultrasonic elements. The ultrasonic element of the ultrasonic receiver is referred to as an ultrasonic receiving element.

The ultrasonic transmitter sequentially transmits the ultrasonic wave from the plurality of ultrasonic transmission elements and the optimum ultrasonic transmission element which is the ultrasonic transmission element that performs transmission when the ultrasonic receiver receives the ultrasonic wave with the strongest intensity is specified. Furthermore, in the ultrasonic receiver, the plurality of ultrasonic receiving elements sequentially receive the ultrasonic wave transmitted by the optimum ultrasonic transmission element and the optimum ultrasonic receiving element which is the ultrasonic receiving element which received the ultrasonic wave with the strongest intensity is specified.

When the relative position between the ultrasonic transmitter and the ultrasonic receiver changes, the combination of the optimum ultrasonic receiving element which receives ultrasonic wave with the strongest intensity and the optimum ultrasonic transmission element which transmits the ultrasonic wave of this time changes. The combination of the optimum ultrasonic transmission element and the optimum ultrasonic receiving element is the combination of the ultrasonic transmission element and the ultrasonic receiving element positioned at the optimum position for transmitting and receiving the ultrasonic wave.

Next, the optimum ultrasonic transmission element transmits the ultrasonic wave to the detection target passing between the ultrasonic transmitter and the ultrasonic receiver. Next, the optimum ultrasonic receiving element receives the ultrasonic wave passed through the detection target. As the number of detection targets passing between the ultrasonic transmitter and the ultrasonic receiver increases, the intensity of the ultrasonic wave received by the optimum ultrasonic receiving element decreases. Then, the number of the detection target is detected from the intensity of the ultrasonic wave received by the ultrasonic receiver.

Therefore, even when the relative position between the ultrasonic transmitter and the ultrasonic receiver varies when the ultrasonic transmitter and the ultrasonic receiver are assembled, it is possible to transmit the ultrasonic wave from the optimum ultrasonic transmission element that transmits the ultrasonic wave with the strongest intensity to be received by the optimum ultrasonic receiving element. As a result, the substrate and the ultrasonic receiver can be assembled without requiring the positional accuracy of the relative position.

The electronic device includes a multi-feed detection device installed in a transport path of a detection target and detecting whether or not two or more of the detection targets are overlapped, in which the multi-feed detection device is the multi-feed detection device described above.

According to this configuration, the electronic device includes a transport path. A multi-feed detection device is installed in the transport path, and the multi-feed detection device detects whether or not two or more detection targets are overlapped. The above-described multi-feed detection device is used for the multi-feed detection device. The above-described multi-feed detection device is a device that can be easily assembled. Accordingly, the electronic device can be a device including the multi-feed detection device with good assembly.

What is claimed is:

1. A multi-feed detection method for causing a processor to execute a process, the method comprising executing on the processor the steps of:
   transmitting an ultrasonic wave by an ultrasonic transmitter;
   selectively activating a single one of a plurality of ultrasonic receiving elements of an ultrasonic receiver to receive the ultrasonic wave and provide an intensity of the received ultrasonic wave;
   detecting a value of the intensity of the received ultrasonic wave that is received by the selectively activated ultrasonic receiving element;
   repeating the transmitting of the ultrasonic wave, the selectively activating of the single one of the plurality of ultrasonic receiving elements to receive the ultrasonic wave, and the detecting of the value of the intensity of the received ultrasonic wave until the processor activates all of the plurality of ultrasonic receiving elements;
   comparing the values of the intensities of the received ultrasonic waves received by the plurality of ultrasonic receiving elements to determine a target ultrasonic receiving element among the plurality of ultrasonic receiving elements, the target ultrasonic receiving element having a highest value among the values of the intensities of the received ultrasonic waves;
   activating the ultrasonic transmitter to transmit a detection ultrasonic wave toward a detection sheet object;
   activating the target ultrasonic receiving element among the plurality of ultrasonic receiving elements of the ultrasonic receiver to receive the detection ultrasonic wave that passes through the detection sheet object;
   determining a detection value of an intensity of the received detection ultrasonic wave to provide a detection result; and
   detecting a number of sheets of the detection sheet object based on the detection result.

2. A multi-feed detection method for causing a processor to execute a process, the method comprising executing on the processor the steps of:
   selectively activating a single one of a plurality of ultrasonic transmitting elements of an ultrasonic transmitter to transmit an ultrasonic wave;
   receiving the ultrasonic wave from the single one of the plurality of ultrasonic transmitting elements by an ultrasonic receiver and provide an intensity of the received ultrasonic wave;
   detecting a value of the intensity of the received ultrasonic wave that is transmitted by the selectively activated ultrasonic transmitting element;
   repeating the selectively activating of the single one of the plurality of ultrasonic transmitting elements to transmit the ultrasonic wave, the receiving of the ultrasonic wave, and the detecting of the value of the intensity of the received ultrasonic wave until the processor activates all of the plurality of ultrasonic transmitting elements;
   comparing the values of the intensities of the received ultrasonic waves received by the ultrasonic receiver to determine a target ultrasonic transmitting element among the plurality of ultrasonic transmitting elements, the target ultrasonic transmitting element transmitting the ultrasonic wave having a highest value among the values of the intensities of the received ultrasonic waves;
   activating the target ultrasonic transmitting element among the plurality of ultrasonic transmitting elements of the ultrasonic transmitter to transmit a detection ultrasonic wave toward a detection sheet object;
   activating the ultrasonic receiver to receive the detection ultrasonic wave that passes through the detection sheet object;
   determining a detection value of an intensity of the received detection ultrasonic wave to provide a detection result; and
   detecting a number of sheets of the detection sheet object based on the detection result.

3. A multi-feed detection method for causing a processor to execute a process, the method comprising executing on the processor the steps of:
   selectively activating a single one of a plurality of ultrasonic transmitting elements of an ultrasonic transmitter to transmit an ultrasonic wave;
   receiving the ultrasonic wave from the single one of the plurality of ultrasonic transmitting elements by an ultrasonic receiver and provide an intensity of the received ultrasonic wave;
   detecting a value of the intensity of the received ultrasonic wave that is transmitted by the selectively activated ultrasonic transmitting element;
   repeating the selectively activating of the single one of the plurality of ultrasonic transmitting elements to transmit the ultrasonic wave, the receiving of the ultrasonic wave, and the detecting of the value of the intensity of the received ultrasonic wave until the processor activates all of the plurality of ultrasonic transmitting elements;
   comparing the values of the intensities of the received ultrasonic waves received by the ultrasonic receiver to determine a target ultrasonic transmitting element among the plurality of ultrasonic transmitting elements, the target ultrasonic transmitting element transmitting the ultrasonic wave having a highest value among the values of the intensities of the received ultrasonic waves;

transmitting the ultrasonic wave by the target ultrasonic transmitting element among the plurality of ultrasonic transmitting elements of the ultrasonic transmitter;

selectively activating a single one of a plurality of ultrasonic receiving elements of the ultrasonic receiver to receive the ultrasonic wave from the target ultrasonic transmitting element and provide the intensity of the received ultrasonic wave;

detecting the value of the intensity of the received ultrasonic wave that is received by the selectively activated ultrasonic receiving element;

repeating the transmitting of the ultrasonic wave transmitted by the target ultrasonic transmitting element, the selectively activating of the single one of the plurality of ultrasonic receiving elements to receive the ultrasonic wave, and the detecting of the value of the intensity of the received ultrasonic wave until the processor activates all of the plurality of ultrasonic receiving elements;

comparing the values of the intensities of the received ultrasonic waves received by the plurality of ultrasonic receiving elements to determine a target ultrasonic receiving element among the plurality of ultrasonic receiving elements, the target ultrasonic receiving element having a highest value among the values of the intensities of the received ultrasonic waves transmitted by the target ultrasonic transmitting element;

activating the target ultrasonic transmitting element among the plurality of ultrasonic transmitting elements of the ultrasonic transmitter to transmit a detection ultrasonic wave toward a detection sheet object;

activating the target ultrasonic receiving element among the plurality of ultrasonic receiving elements of the ultrasonic receiver to receive the detection ultrasonic wave that passes through the detection sheet object;

determining a detection value of an intensity of the received detection ultrasonic wave to provide a detection result; and detecting a number of sheets of the detection sheet object based on the detection result.

4. A sheet transporting method for causing a processor to execute a process, the method comprising executing on the processor the steps of:

supplying a detection sheet object by a transport mechanism from a feeder in which a plurality of sheets of the detection sheet object are maintained;

detecting a number of sheets of the detection sheet object supplied by the transport mechanism by using the multi-feed detection method according to claim 1;

processing with respect to the detection sheet object by a processing device after the detecting of the number of sheets of the detection sheet object; and discharging the detection sheet object by a discharge mechanism after the detection sheet object is processed by the processing device.

5. A sheet transporting method for causing a processor to execute a process, the method comprising executing on the processor the steps of:

supplying a detection sheet object by a transport mechanism from a feeder in which a plurality of sheets of the detection sheet object are maintained;

detecting a number of sheets of the detection sheet object supplied by the transport mechanism by using the multi-feed detection method according to claim 2;

processing with respect to the detection sheet object by a processing device after the detecting of the number of sheets of the detection sheet object; and discharging the detection sheet object by a discharge mechanism after the detection sheet object is processed by the processing device.

6. A sheet transporting method for causing a processor to execute a process, the method comprising executing on the processor the steps of:

supplying a detection sheet object by a transport mechanism from a feeder in which a plurality of sheets of the detection sheet object are maintained;

detecting a number of sheets of the detection sheet object supplied by the transport mechanism by using the multi-feed detection method according to claim 3;

processing with respect to the detection sheet object by a processing device after the detecting of the number of sheets of the detection sheet object; and discharging the detection sheet object by a discharge mechanism after the detection sheet object is processed by the processing device.

* * * * *